US012782118B2

(12) United States Patent
Goodwin et al.

(10) Patent No.: US 12,782,118 B2
(45) Date of Patent: Nov. 3, 2026

(54) SYSTEMS AND METHODS FOR MEASURING HEIGHT PROPERTIES OF SURFACES

(71) Applicant: Nikon Corporation, Tokyo (JP)

(72) Inventors: Eric Peter Goodwin, Oro Valley, AZ (US); Goldie Lynne Goldstein, Oro Valley, AZ (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 18/287,670

(22) PCT Filed: Apr. 19, 2022

(86) PCT No.: PCT/US2022/025303
§ 371 (c)(1),
(2) Date: Oct. 20, 2023

(87) PCT Pub. No.: WO2022/225897
PCT Pub. Date: Oct. 27, 2022

(65) Prior Publication Data

US 2024/0191986 A1 Jun. 13, 2024

Related U.S. Application Data

(60) Provisional application No. 63/177,287, filed on Apr. 20, 2021.

(51) Int. Cl.
*G01B 11/24* (2006.01)
*G01B 9/02001* (2022.01)
(Continued)

(52) U.S. Cl.
CPC ...... *G01B 11/2441* (2013.01); *G01B 9/02007* (2013.01); *G01B 11/0608* (2013.01); *G01B 11/303* (2013.01); *G01B 2290/70* (2013.01)

(58) Field of Classification Search
CPC ............ G01B 11/2441; G01B 11/0608; G01B 11/303; G01B 9/02007; G01B 9/02035; G01B 2290/70; G01B 9/02097
See application file for complete search history.

(56) References Cited

U.S. PATENT DOCUMENTS 4,353,650 A 10/1982 Sommargren
4,930,894 A * 6/1990 Baldwin ............ G01B 9/02007 356/485

(Continued)

FOREIGN PATENT DOCUMENTS

JP S58173423 A 10/1983

OTHER PUBLICATIONS

Dong Wei, Satoru Takahashi, Kiyoshi Takamasu, and Hirokazu Matsumoto, Analysis of the temporal coherence function of a femtosecond optical frequency comb, Apr. 27, 2009, Optics Express, vol. 17, No. 9, pp. 7011-7018 (Year: 2009).*

(Continued)

*Primary Examiner* — Erin R Garber

(57) ABSTRACT

The problem of measuring height properties (for instance, for aspheric optical components) is addressed by systems and methods that employ heterodyne optical interferometry to detect a plurality of interference patterns corresponding to a plurality of orientations of the surface and that determine a height property (such as a mid-spatial frequency spectrum or topography) of the surface from the plurality of interference patterns.

33 Claims, 17 Drawing Sheets

(51) Int. Cl.

| | |
|---|---|
| ***G01B 11/06*** | (2006.01) |
| ***G01B 11/30*** | (2006.01) |

(56) References Cited

U.S. PATENT DOCUMENTS

| | | | | | |
|---|---|---|---|---|---|
| 5,926,266 | A * | 7/1999 | Dorundo | G01N 21/9506 | 356/337 |
| 6,396,069 | B1 | 5/2002 | MacPherson | | |
| 7,990,543 | B1 * | 8/2011 | Mello | G01B 9/02081 | 356/520 |
| 2004/0119983 | A1 * | 6/2004 | Brasen | G01B 11/303 | 356/492 |
| 2014/0293291 | A1 * | 10/2014 | Tang | G01B 11/0675 | 356/511 |
| 2014/0374575 | A1 * | 12/2014 | Takesue | G01B 9/02002 | 250/208.5 |
| 2015/0192769 | A1 * | 7/2015 | Dresel | G01B 9/02085 | 356/450 |
| 2018/0216927 | A1 * | 8/2018 | Vyacheslav | G01H 9/004 | |
| 2018/0224266 | A1 * | 8/2018 | Perea | G01B 9/02007 | |
| 2019/0244343 | A1 * | 8/2019 | Chuang | G06F 3/0484 | |
| 2020/0033117 | A1 * | 1/2020 | Huang | G01B 11/2441 | |
| 2021/0033386 | A1 * | 2/2021 | Liu | G01B 9/02083 | |

OTHER PUBLICATIONS

Machine Translation of JPS58173423, pp. 1-4.

* cited by examiner

SYSTEMS AND METHODS FOR MEASURING HEIGHT PROPERTIES OF SURFACES

CROSS-REFERENCE

The present application claims priority to U.S. Provisional Patent Application No. 63/177,287, entitled "SYSTEMS AND METHODS FOR MEASURING HEIGHT PROPERTIES OF SURFACES," filed on Apr. 20, 2021, which application is herein incorporated by reference in its entirety for all purposes.

BACKGROUND OF THE INVENTION

Numerous applications in science and technology may require rapid and accurate assessment of height properties of surfaces. For instance, the manufacture of optical components may require rapid and accurate assessment for quality control purposes or to diagnose errors in manufacturing systems and methods. Current systems and methods for measuring height properties of surfaces may suffer from a variety of deficiencies, such as being too slow, too expensive, or too inaccurate. These deficiencies may be particularly acute in measuring height properties of surfaces having an aspheric form, such as those found in aspheric optical components. Moreover, such current systems and methods may require the use of null optics or null correctors to correct for the aspheric nature of the surfaces. Such null optics or null correctors may add significant complexity or cost to current systems and methods for measuring height properties of surfaces. Accordingly, presented herein are systems and methods for measuring height properties of surfaces.

BRIEF DESCRIPTION OF THE DRAWINGS

Various embodiments of the invention are disclosed in the following detailed description and the accompanying drawings.

DETAILED DESCRIPTION

Figure 1:
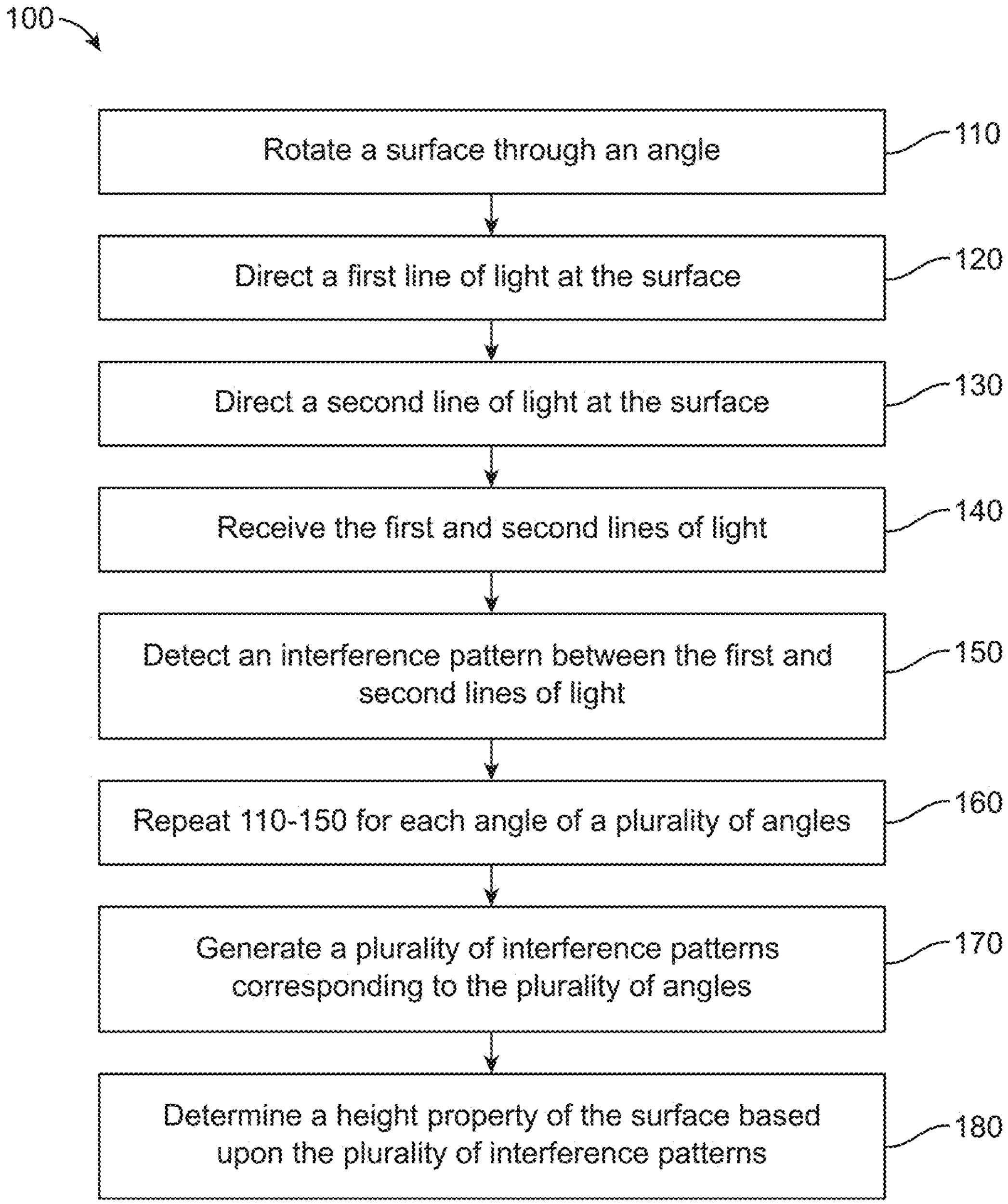
FIG. 1 shows a flowchart depicting an exemplary method for measuring a height property of a surface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the phrase "interference pattern" denotes a series of alternating regions of high optical intensity and regions of low optical intensity resulting, respectively, from constructive and destructive interference of two or more beams of light.

Recent work in optics has allowed the production of optical components, such as lenses, that have an aspheric form. These optical components find extensive use in numerous applications. As such, it is important to measure and characterize these optical components to be sure that they are manufactured to specification. Unfortunately, current systems and methods for characterizing such optical components suffer from a variety of deficiencies, such as being too slow, too expensive, or too inaccurate. Moreover, current systems and methods may require the use of null optics or null correctors to correct for the aspheric nature of the surfaces, adding significant complexity or cost.

Accordingly, the problem of measuring height properties (for instance, for aspheric optical components) is addressed by systems and methods that employ heterodyne optical interferometry to detect a plurality of interference patterns corresponding to a plurality of orientations of the surface and that determine a height property (such as a mid-spatial frequency spectrum or topography) of the surface from the plurality of interference patterns. The systems and methods may detect at least part of the plurality of interference patterns.

In particular, the systems and methods operate by directing first and second lines of light at the surface and detecting an interference pattern (or at least part of the interference pattern) between the first and second lines of light. As the surface is rotated, a plurality of interference patterns is obtained, with each interference pattern corresponding to a different position on the surface (for example, a different angular orientation of the surface). The height property of the surface is then determined based upon the plurality of interference patterns. The height property may be determined, for instance, by determining differences in surface height between a plurality of locations on the first line of light and a plurality of locations on the second line of light based upon the plurality of interference patterns and determining the height property based upon the plurality of differences in surface height.

The systems and methods may allow rapid characterization of the topographies of surfaces of optical components or other manufactured items. Such rapid characterization may provide numerous benefits. For instance, rapid characterization may allow for higher throughput characterization of the topographies. Rapid characterization may also allow for an increase in accuracy of the characterization, as it may mitigate the error associated with thermal drift or vibrational noise within the measurement system (for instance, thermal drift or vibrational noise within an optical measurement system) or thermal drift or vibrational noise within a surface under study.

A method for measuring a height property of a surface is disclosed herein. The method generally comprises: a) for each angle of a plurality of angles: i) rotating the surface through the angle; ii) directing a first line of light at the surface; iii) directing a second line of light at the surface; iv) receiving the first and second lines of light, the first and second lines of light having a shear distance between one another; and v) detecting an interference pattern (or at least part of the interference pattern) between the first and second lines of light; b) generating a plurality of interference patterns, each interference pattern of the plurality of interference patterns corresponding to an angle of the plurality of angles; and c) determining the height property of the surface based upon the plurality of interference patterns. In some embodiments, the surface comprises a surface of an optical component. In some embodiments, the optical component comprises an aspheric optical component. In some embodiments, the aspherical optical component comprises an aspheric lens. In some embodiments, the first line of light comprises a first frequency or wavelength and the second line of light comprises a second frequency or wavelength different from the first frequency or wavelength. In some embodiments, the first line of light comprises a first polarization and the second line of light comprises a second polarization different from the first polarization. In some embodiments, a portion of the first line of light or a portion of the second line of light is substantially normal to the surface along at least one axis. In some embodiments, the first line of light is substantially parallel to the second line of light. In some embodiments, the method further comprises, prior to (a)(ii), introducing the shear distance between the first line of light and the second line of light. In some embodiments, the method further comprises, subsequent to (a)(iii), introducing the shear distance between the first line of light and the second line of light. In some embodiments, the method further comprises repeating (a)-(c) for a plurality of shear distances between the first line of light and the second line of light. In some embodiments, the height property comprises a mid-spatial frequency (MSF) spectrum or a topography of the surface. In some embodiments, (c) comprises: i) determining a plurality of differences in surface height between a first plurality of locations on the first line of light and a second plurality of locations on the second line of light based upon the plurality of interference patterns; and ii) determining the height property based upon the plurality of differences in surface height. In some embodiments, the method further comprises, prior to (a)(ii), orthogonally polarizing the first line of light with respect to the second line of light. In some embodiments, the method further comprises, subsequent to (a)(iii) and prior to (a)(iv), parallelly polarizing the first line of light with respect to the second line of light. In some embodiments, the first line of light and the second line of light have a temporal coherence of at most 1,000 femtoseconds (fs). In some embodiments, (b) comprises generating the plurality of interference patterns at a rate of at least 100 Hertz (Hz). In some embodiments, (c) comprises determining the height property of the surface with a spatial resolution of 25 micrometers (μm) or less.

Further disclosed herein is a system for measuring a height property of a surface, comprising: a) a rotational module configured to rotate the surface through a plurality of angles; b) an optical source module configured to, for each angle of the plurality of angles, direct a first line of light and a second line of light at the surface; c) an optical detector configured to, for each angle of the plurality of angles, receive the first and second lines of light and detect an interference pattern between the first and second lines of light, the first and second lines of light having a shear distance between one another; and d) a storage module configured to store the interference pattern associated with each angle of the plurality of angles, thereby generating a plurality of interference patterns. In some embodiments, the surface comprises a surface of an optical component. In some embodiments, the optical component comprises an aspheric optical component. In some embodiments, the aspheric optical component comprises an aspheric lens. In some embodiments, the first line of light comprises a first frequency or wavelength and the second line of light comprises a second frequency or wavelength different from the first frequency or wavelength. In some embodiments, the first line of light comprises a first polarization and the second line of light comprises a second polarization different from the first polarization. In some embodiments, a portion of the first line of light or a portion of the second line of light is substantially normal to the surface along at least one axis. In some embodiments, the first line of light is substantially parallel to the second line of light. In some embodiments, the system further comprises a shear adjustment module configured to introduce the shear distance between the first line of light and the second line of light. In some embodiments, the shear adjustment module is configured to introduce a plurality of shear distances between the first line of light and the second line of light. In some embodiments, the shear adjustment module comprises a Wollaston prism. In some embodiments, the shear adjustment module is located between the optical source module and the surface. In some embodiments, the shear adjustment module is located between the surface and the optical detector. In some embodiments, the height property comprises an MSF spectrum or a topography of the surface. In some embodiments, the system further comprises an analysis module configured to: i) determine a plurality of differences in surface height between a first plurality of locations on the first line of light and a second plurality of locations on the second line of light based upon the plurality of interference patterns; and ii) determine the height property based upon the plurality of differences in surface height. In some embodiments, the analysis module comprises: a processor; and a memory coupled with the processor, wherein the memory is configured to provide the processor with instructions which when executed cause the processor to execute (i) and (ii). In some embodiments, the analysis module comprises: a processor configured to execute (i) and (ii); and a memory coupled to the processor and configured to provide the processor with instructions corresponding to (i) and (ii). In some embodiments, the system further comprises a first polarizing module configured to orthogonally polarize the first line of light with respect to the second line of light, the first polarizing module located between the optical source module and the surface. In some embodiments, the first polarizing module comprises two polarizers and an amplitude beamsplitter, a polarizing beamsplitter, or two polarization-maintaining (PM) optical fibers combined into one PM fiber using a fiber combiner. In some embodiments, the system further comprises a second polarizing module configured to parallelly polarize the first line of light with respect to the second line of light, the second polarizing module located between the surface and the optical detector. In some embodiments, the second polarizing module comprises two polarizers and an amplitude beamsplitter, a polarizing beamsplitter, or two PM optical fibers combined into one PM fiber using a fiber combiner. In some embodiments, the optical source module comprises an optical source configured to emit the first and second lines of light. In some embodiments, the optical source comprises a light emitting diode (LED) or superluminescent diode (SLD). In some embodiments, the optical source module further comprises an acousto-optic frequency shifter (AOFS) configured to introduce a frequency or wavelength shift between the first line of light and the second line of light. In some embodiments, the optical source module comprises a first optical source configured to emit the first line of light and a second optical source configured to emit the second line of light. In some embodiments, the first optical source or the second optical source comprises an LED, an SLD, or a laser. In some embodiments, the optical detector comprises a line sensor. In some embodiments, the first line of light and the second line of light have a temporal coherence of at most 1,000 fs. In some embodiments, the system is configured to generate the plurality of interference patterns at a rate of at least 100 Hz. In some embodiments, the system is configured to determine the height property of the surface with a spatial resolution of 25 μm or less.

Further disclosed herein is a method for measuring a height property of a surface, comprising: a) for each location of a plurality of locations: i) positioning the surface at the location; ii) directing a first line of light at the surface; iii) directing a second line of light at the surface; iv) receiving the first and second lines of light, the first and second lines of light having a shear distance between one another; and v) detecting an interference pattern between the first and second lines of light; b) generating a plurality of interference patterns, each interference pattern of the plurality of interference patterns corresponding to a location of the plurality of locations; and c) determining the height property of the surface based upon the plurality of interference patterns. In some embodiments, the surface comprises a surface of a wing. In some embodiments, the wing comprises a plurality of aerodynamic riblets.

Further disclosed herein is a system for measuring a height property of a surface, comprising: a) a positioning module configured to position the surface at a plurality of locations; b) an optical source module configured to, for each location of the plurality of locations, direct a first line of light and a second line of light at the surface; c) an optical detector configured to, for each location of the plurality of locations, receive the first and second lines of light and detect an interference pattern between the first and second lines of light, the first and second lines of light having a shear distance between one another; and d) a storage module configured to store the interference pattern associated with each location of the plurality of locations, thereby generating a plurality of interference patterns. In some embodiments, the surface comprises a surface of a wing. In some embodiments, the wing comprises a plurality of aerodynamic riblets.

Further disclosed herein is a method for measuring a height property of a surface, comprising: a) for each angle of a plurality of angles: i) rotating the surface through the angle; ii) directing a first line of light at the surface; iii) directing a second line of light at the surface; iv) directing a third line of light at the surface; v) directing a fourth line of light at the surface; vi) receiving a first portion of the first line of light and a first portion of the second line of light, the first portion of the first line of light and the first portion of the second line of light having a first radial shear distance between one another; vii) detecting a first interference pattern between the first portion of the first line of light and the first portion of the second line of light; viii) receiving a second portion of the first line of light and a second portion of the second line of light, the second portion of the first line of light and the second portion of the second line of light having a second radial shear distance between one another, the second radial shear distance being different from the first radial shear distance; ix) detecting a second interference pattern between the second portion of the first line of light and the second portion of the second line of light; x) receiving the fourth line of light and a third portion of the first line of light, the fourth line of light and the third portion of the first line of light having a first azimuthal shear distance between one another; xi) detecting a third interference pattern between the fourth line of light and the third portion of the first line of light; xii) receiving the third line of light and a third portion of the second line of light, the third line of light and the third portion of the second line of light having a second azimuthal shear distance between one another, the second azimuthal shear distance being different from the first azimuthal shear distance; and xiii) detecting a fourth interference pattern between the third line of light and the third portion of the second line of light; b) generating: (i) a first plurality of interference patterns, each interference pattern of the first plurality of interference patterns corresponding to an angle of the plurality of angles and the first interference pattern associated therewith; (ii) a second plurality of interference patterns, each interference pattern of the second plurality of interference patterns corresponding to an angle of the plurality of angles and the second interference pattern associated therewith; (iii) a third plurality of interference patterns, each interference pattern of the third plurality of interference patterns corresponding to an angle of the plurality of angles and the third interference pattern associated therewith; and (iv) a fourth plurality of interference patterns, each interference pattern of the fourth plurality of interference patterns corresponding to an angle of the plurality of angles and the fourth interference pattern associated therewith; and c) determining the height property of the surface based upon the first plurality of interference patterns, the second plurality of interference patterns, the third plurality of interference patterns, and the fourth plurality of interference patterns. In some embodiments, the first and third lines of light comprise a first frequency or wavelength and the second and fourth lines of light comprise a second frequency or wavelength different from the first frequency or wavelength. In some embodiments, the first portion of the first line of light comprises a first polarization and the first portion of the second line of light comprises a second polarization different from the first polarization. In some embodiments, the second portion of the first line of light comprises a first polarization and the second portion of the second line of light comprises a second polarization different from the first polarization. In some embodiments, the third portion of the first line of light comprises a first polarization and the fourth line of light comprises a second polarization different from the first polarization. In some embodiments, the third portion of the second line of light comprises a first polarization and the third line of light comprises a second polarization different from the first polarization. In some embodiments, the method further comprises, prior to (a)(ii), introducing the first radial shear distance between the first portion of the first line of light and the first portion of the second line of light. In some embodiments, the method further comprises, prior to (a)(ii), introducing the second radial shear distance between the second portion of the first line of light and the second portion of the second line of light. In some embodiments, the method further comprises, prior to (a)(ii), introducing the first azimuthal shear distance between the fourth line of light and the third portion of the first line of light. In some embodiments, the method further comprises, prior to (a)(ii), introducing the first azimuthal shear distance between the third line of light and the third portion of the second line of light.

Further disclosed herein is a system for measuring a height property of a surface, comprising: a) a rotational module configured to rotate the surface through a plurality of angles; b) an optical source module configured to, for each angle of the plurality of angles, direct a first line of light, a second line of light, a third line of light, and a fourth line of light at the surface; c) a first optical detector configured to, for each angle of the plurality of angles, receive a first portion of the first line of light and a first portion of the second line of light and detect a first interference pattern between the first portion of the first line of light and the first portion of the second line of light, the first portion of the first line of light and the first portion of the second line of light having a first radial shear distance between one another; d) a second optical detector configured to, for each angle of the plurality of angles, receive a second portion of the first line of light and a second portion of the second line of light and detect a second interference pattern between the second portion of the first line of light and the second portion of the second line of light, the second portion of the first line of light and the second portion of the second line of light having a second radial shear distance between one another; e) a third optical detector configured to, for each angle of the plurality of angles, receive the fourth line of light and a third portion of the first line of light and detect a third interference pattern between the fourth line of light and the third portion of the first line of light, the fourth line of the light and the third portion of the first line of light having a first azimuthal shear distance between one another; f) a fourth optical detector configured to, for each angle of the plurality of angles, receive the third line of light and a third portion of the second line of light and detect a fourth interference pattern between the third line of light and the third portion of the second line of light, the third line of the light and the third portion of the second line of light having a second azimuthal shear distance between one another; and g) a storage module configured to: (i) store the first interference pattern associated with each angle of the plurality of angles, thereby generating a first plurality of interference patterns; (ii) store the second interference pattern associated with each angle of the plurality of angles, thereby generating a second plurality of interference patterns; (iii) store the third interference pattern associated with each angle of the plurality of angles, thereby generating a third plurality of interference patterns; and (iv) store the fourth interference pattern associated with each angle of the plurality of angles, thereby generating a fourth plurality of interference patterns. In some embodiments, the first and third lines of light comprise a first frequency or wavelength and the second and fourth lines of light comprise a second frequency or wavelength different from the first frequency or wavelength. In some embodiments, the first portion of the first line of light comprises a first polarization and the first portion of the second line of light comprises a second polarization different from the first polarization. In some embodiments, the second portion of the first line of light comprises a first polarization and the second portion of the second line of light comprises a second polarization different from the first polarization. In some embodiments, the third portion of the first line of light comprises a first polarization and the fourth line of light comprises a second polarization different from the first polarization. In some embodiments, the third portion of the second line of light comprises a first polarization and the third line of light comprises a second polarization different from the first polarization. In some embodiments, the system further comprises a radial shear module configured to introduce: (i) the first radial shear distance between the first portion of the first line of light and the first portion of the second line of light and (ii) the second radial shear distance between the second portion of the first line of light and the second portion of the second line of light. In some embodiments, the radial shear module comprises a Wollaston prism. In some embodiments, the radial shear module is located between the surface and the first optical detector and between the surface and the second optical detector. In some embodiments, the system further comprises an azimuthal shear module configured to introduce: (i) the first azimuthal shear distance between the fourth line of the light and the third portion of the first line of light and (ii) the second azimuthal shear distance between the third line of the light and the third portion of the second line of light. In some embodiments, the azimuthal shear module comprises a Risley prism and a birefringent wedge. In some embodiments, the azimuthal shear module is located between the optical source module and the surface. In some embodiments, the system further comprises an optical path difference (OPD) correction module configured to match: (i) an OPD between the fourth line of light and the third portion of the first line of light and (ii) an OPD between the third line of light and the third portion of the second line of light. In some embodiments, the OPD correction module comprises a Risley prism and a birefringent wedge. In some embodiments, the OPD correction module further comprises a Wollaston prism configured to impart an angular separation between the third portion of the first line of light and the third portion of the second line of light. In some embodiments, the OPD correction module is located between the surface and the third optical detector and between the surface and the fourth optical detector. In some embodiments, the system further comprises an analysis module configured to determine the height property of the surface based upon the first plurality of interference patterns, the second plurality of interference patterns, the third plurality of interference patterns, and the fourth plurality of interference patterns by: i) determining a plurality of differences in surface height between a first plurality of locations on the first line of light and a second plurality of locations on the second line of light based upon the plurality of interference patterns; and ii) determining the height property based upon the plurality of differences in surface height. In some embodiments, the analysis module comprises: a processor; and a memory coupled with the processor, wherein the memory is configured to provide the processor with instructions which when executed cause the processor to execute (i) and (ii). In some embodiments, the analysis module comprises: a processor configured to execute (i) and (ii); and a memory coupled to the processor and configured to provide the processor with instructions corresponding to (i) and (ii).

Systems and Methods of Measuring a Height Property of a Surface

The systems and methods described herein generally apply heterodyne interferometry to a rotating surface. A narrow beam is projected along a radius of a surface under study. The beam comprises two overlapping collinear lines of light having slightly different frequencies or wavelengths and different (for instance, orthogonal) polarizations. After reflection from the surface, the beam is imaged to a line sensor so that numerous measurements (for instance, 500 or more measurements) are made along the radial direction of the surface for each image captured by the line sensor. A short time later, as the part rotates, the line sensor captures light from a slightly different azimuthal position of the surface. The two lines of light are sheared radially in the optical system, so that light from one radial position on the surface is interfered with light from a slightly shifted (for instance, around 100 micrometers) radial position on the part. A shearing interferogram is obtained, which provides information about the local slope of the surface. Since the two lines of light have slightly different frequencies or wavelengths, the phase between them changes continuously, allowing for rapid phase shifting. The line sensor is synchronized to the rate of change of the phase shift and phase shifting procedures are applied to determine the phase of the fringes in the interferogram. For example, the phase shift between the two lines of light may change by about a full period at about ¼ of the line rate of the line sensor. The measured phase across the line sensor represents the first derivative of the surface height (i.e., the surface slope). The surface slope is spatially integrated and the height at each point of the surface is recovered.

FIG. 1 shows a flowchart depicting an exemplary method 100 for measuring a height property of a surface. In the example shown, the surface is rotated through an angle at 110. In some embodiments, the surface comprises a surface of an optical component. In some embodiments, the optical component comprises an aspheric optical component. In some embodiments, the aspheric optical component comprises an aspheric lens. In some embodiments, the aspheric optical component comprises a metallic insert. In some embodiments, the aspheric optical component comprises a specular surface.

At 120, a first line of light is directed at the surface. In some embodiments, the first line of light comprises a first frequency or wavelength and a first polarization. In some embodiments, the first frequency or wavelength is at least about 200 nanometers (nm) or more. In some embodiments, the first frequency or wavelength is at most about 1,000 nm or less. In some embodiments, the first frequency or wavelength is between about 200 nm and about 1,000 nm. In some embodiments, the first polarization has a linear polarization or an elliptical polarization, At 130, a second line of light is directed at the surface. In some embodiments, the second line of light comprises a second frequency or wavelength and a second polarization. In some embodiments, the second frequency or wavelength is different from the first frequency or wavelength. In some embodiments, the second polarization is different from the first polarization. In some embodiments, the second frequency or wavelength is at least about 200 nm or more. In some embodiments, the second frequency or wavelength is at most about 1,000 nm or less. In some embodiments, the second frequency or wavelength is between about 200 nm and about 1,000 nm. In some embodiments, the second polarization has a linear polarization or an elliptical polarization, In some embodiments, the first and second frequencies or wavelengths are slightly different. For instance, in some embodiments, the first and second wavelengths are different by at least about 0.001 femtometers (fm) or more. In some embodiments, the first and second wavelengths are different by at most about 1 fm or less. In some embodiments, the first and second wavelengths are different by between about 0.001 fm and about 1 fm. In some embodiments, the first frequency or wavelength is larger than the second frequency or wavelength. In some embodiments, the first frequency or wavelength is smaller than the second frequency or wavelength. In some embodiments, the first and second lines of light are orthogonally polarized prior to directing the first and second lines of light at the surface. In some embodiments, the method comprises orthogonally polarizing the first line of light with respect to the second line of light or orthogonally polarizing the second line of light with respect to the first line of light. In some embodiments, the first and second lines of light are reflected from the surface subsequent to being directed at the surface. In some embodiments, the first and second polarization may be orthogonal polarization.

The frequency or wavelength difference between the first and second lines of light may allow a continuous phase shift between the first and second lines of light. Thus, the frequency or wavelength difference may be utilized to implement a phase-shift interferometric measurement of the surface. Such a measurement may be very fast, as it does not require the moving parts of other interferometric methods.

In some embodiments, the first and second lines of light comprise first and second frequencies, respectively. In some embodiments, the first and second frequencies are slightly different. For instance, in some embodiments, the first and second frequencies are different by at least about 25 Hertz (Hz) or more. In some embodiments, the first and second frequencies are different by at most about 25 kilohertz (kHz) or less. In some embodiments, the first and second frequencies are different by between about 25 Hz and about 25 kHz.

In some embodiments, the first line of light or the second line of light has a temporal coherence of at least about 1 femtosecond (fs) or more. In some embodiments, the first line of light or the second line of light has a temporal coherence of at most about 1,000 ps or less. In some embodiments, the first line of light or the second line of light has a temporal coherence between about 1 fs and about 1,000 fs. Use of a relatively low temporal coherence may be important in order to avoid interferences resulting from unwanted reflections of the first or second line of light, such as reflections from a surface other than the surface under study. For instance, it may be important to receive reflections only from the front surface of an optical component, but not from the back surface of the component.

In some embodiments, the first line of light or the second line of light has a coherence length of at least about 1 micrometer (μm) or more. In some embodiments, the first line of light or the second line of light has a coherence length of at most about 10 mm or less. In some embodiments, the first line of light or the second line of light has a coherence length between about 1 μm and about 10 mm.

In some embodiments, at least a portion of the first line of light or at least a portion of the second line of light is substantially normal to the surface. In some embodiments, the first line of light is substantially parallel to the second line of light. In some embodiments, the first line of light substantially overlaps with the second line of light.

At 140, the first and second lines of light are received. In some embodiments, the first and second lines of light have a shear distance between one another. In some embodiments, the shear distance is introduced prior to directing the first and second lines of light at the surface. In some embodiments, the shear distance is introduced subsequent to directing the first and second lines of light at the surface. In some embodiments, the shear distance is at least about 1 μm or more. In some embodiments, the shear distance is at most about 500 μm or less. In some embodiments, the shear distance is between about 1 μm and about 500 μm.

In some embodiments, the method further comprises parallelly polarizing the first and second lines of light prior to receiving the first and second lines of light. In some embodiments, the method further comprises parallelly polarizing the first line of light with respect to the second line of light. In some embodiments, the method further comprises parallelly polarizing the second line of light with respect to the first line of light. In some embodiments, the first and second lines of light are reflected from the surface prior to being received.

In some embodiments, the first and second lines of light are received using a line sensor, as described herein (for instance, with respect to system 200 of FIG. 2). In some embodiments, the line sensor is synchronized to the phase shift arising due to the difference between the first and second frequencies or wavelengths. In some embodiments, the phase shift may be at least about ⅛, ¼, or ⅜ of the line rate of the line sensor, or more. In some embodiments, the phase shift may be at most about ⅜, ¼, ⅛, or less of the line rate of the line sensor. In some embodiments, the line sensor may capture at least about 1 line for every pi/4, pi/2, or 3pi/4 phase shift. In some embodiments, the line sensor may capture at most about 1 line for every 3pi/4, pi/2, or pi/4 phase shift. In some embodiments, the line sensor receives information corresponding to at least about 100 or more points on the surface. In some embodiments, the line sensor receives information corresponding to at most about 1,000 or fewer points on the surface.

At 150, an interference pattern between the first and second lines of light is detected. In some embodiments, the interference pattern comprises a heterodyne interference pattern. In some embodiments, the interference pattern comprises information corresponding to at least about 100 or more points on the surface. In some embodiments, the interference pattern comprises information corresponding to at most about 1,000 or fewer points on the surface. In some embodiments, the interference pattern comprises information corresponding to a number of points on the surface that is within a range defined by any two of the preceding values.

At 160, steps 110, 120, 130, 140, and 150 are repeated for each angle of a plurality of angles. That is, the surface is rotated through a plurality of angles and, for each angle of the plurality of angles, steps 110, 120, 130, 140, and 150 are performed. Each angle may correspond to an angular orientation of the surface at a particular moment or time or particular moments of time during the rotation of the surface.

At 170, a plurality of interference patterns is generated. In some embodiments, each interference pattern of the plurality of interference patterns corresponds to an angle of the plurality of angles. In some embodiments, the plurality of interference patterns is generated at a rate of at least about 100 Hertz (Hz) or more. In some embodiments, the plurality of interference patterns is generated at a rate of at most about 10,000 Hz or less. In some embodiments, the plurality of interference patterns is generated at a rate between about 100 Hz and about 10,000 Hz.

At 180, the height property of the surface is determined based upon the plurality of interference patterns. In some embodiments, the height property of the surface is determined by determining a plurality of differences in surface height between a first plurality of locations on the first line of light and a second plurality of locations on the second plurality of light based upon the plurality of interference patterns, and then determining the height property based upon the plurality of differences in surface height. In some embodiments, the height property comprises a topography of the surface. In some embodiments, the height property comprises a mid-spatial frequency (MSF) spectrum of the surface. In some embodiments, the MSF spectrum comprises a spatial period of at least about 10 μm or more. In some embodiments, the MSF spectrum comprises a spatial period of at most about 1,000 μm or less. In some embodiments, the MSF spectrum comprises a spatial period between about 10 μm and about 1,000 μm.

Measuring the MSF spectrum may be especially important for characterizing optical components or other items that have been manufactured using subtractive manufacturing techniques, such as milling or turning. For instance, optical components manufactured using diamond turning may have tooling marks having a spatial frequency that is within the MSF range. Such tooling marks may be especially important in optical imaging components, where MSF errors such as onion-ring bokeh may produce optical aberrations. In some cases, the aberrations associated with these errors may represent the limiting factor in aspheric lenses used for, for instance, high-end cameras. As such, measurement of the MSF spectrum may be especially important for characterizing such components.

In some embodiments, the height property is derived from a phase pattern determined from the plurality of interference patterns. In some embodiments, the phase pattern is determined by a phase shifting procedure. In some embodiments, the phase pattern is representative of a first derivative in heights of the surface. In some embodiments, the phase pattern is integrated to obtain the height at each point of the surface. In this manner, the height property of the surface may be obtained.

In some embodiments, the height property of the surface is determined with a radial or azimuthal spatial resolution of less than about 100 μm or less. In some embodiments, the height property of the surface is determined with a radial or azimuthal spatial resolution of more than about 5 μm or more. In some embodiments, the height property of the surface is determined with a radial or azimuthal spatial resolution between about 5 μm and about 100 μm.

In some embodiments, the method 100 further comprises repeating any or all of steps 110, 120, 130, 140, 150, 160, 170, and 180 for a plurality of shear distances. For instance, in some embodiments, the steps are performed 2 or more times using 2 or more shear distances. In some embodiments, the steps are performed 10 or fewer times using 10 or fewer shear distances. In some embodiments, the steps are performed between 2 and 10 times using between 2 and 10 shear distances. In some embodiments, the steps are performed a number of times that is within a range defined by any two of the preceding values using a number of shear distances that is within a range defined by any two of the preceding values. Repeating the steps for a variety of shear distances may allow for a more complete sampling of spatial frequencies. For instance, certain spatial frequencies (such as those corresponding to multiples of the Nyquist rate of the shear distance) may not be sampled when using a single shear distance. By utilizing multiple measurements with different shear distances, the missing spatial frequencies may be obtained. In this manner, the method may obtain more complete measurements of the height property of the surface.

In some embodiments, any or all of 110, 120, 130, 140, 150, 160, 170, and 180 are executed in parallel. In some embodiments, any or all of 110, 120, 130, 140, 150, 160, 170, and 180 are executed in a serial manner.

In some embodiments, any or all of 110, 120, 130, 140, 150, 160, 170, and 180 are applied to only a portion of interest of the surface. In this manner, the user may quickly determine a height property of a part of the surface without the need to wait a longer time to characterize the entire surface. This may be particularly useful if, for instance, it is known or suspected that a part of the surface contains a defect.

Figure 2A:
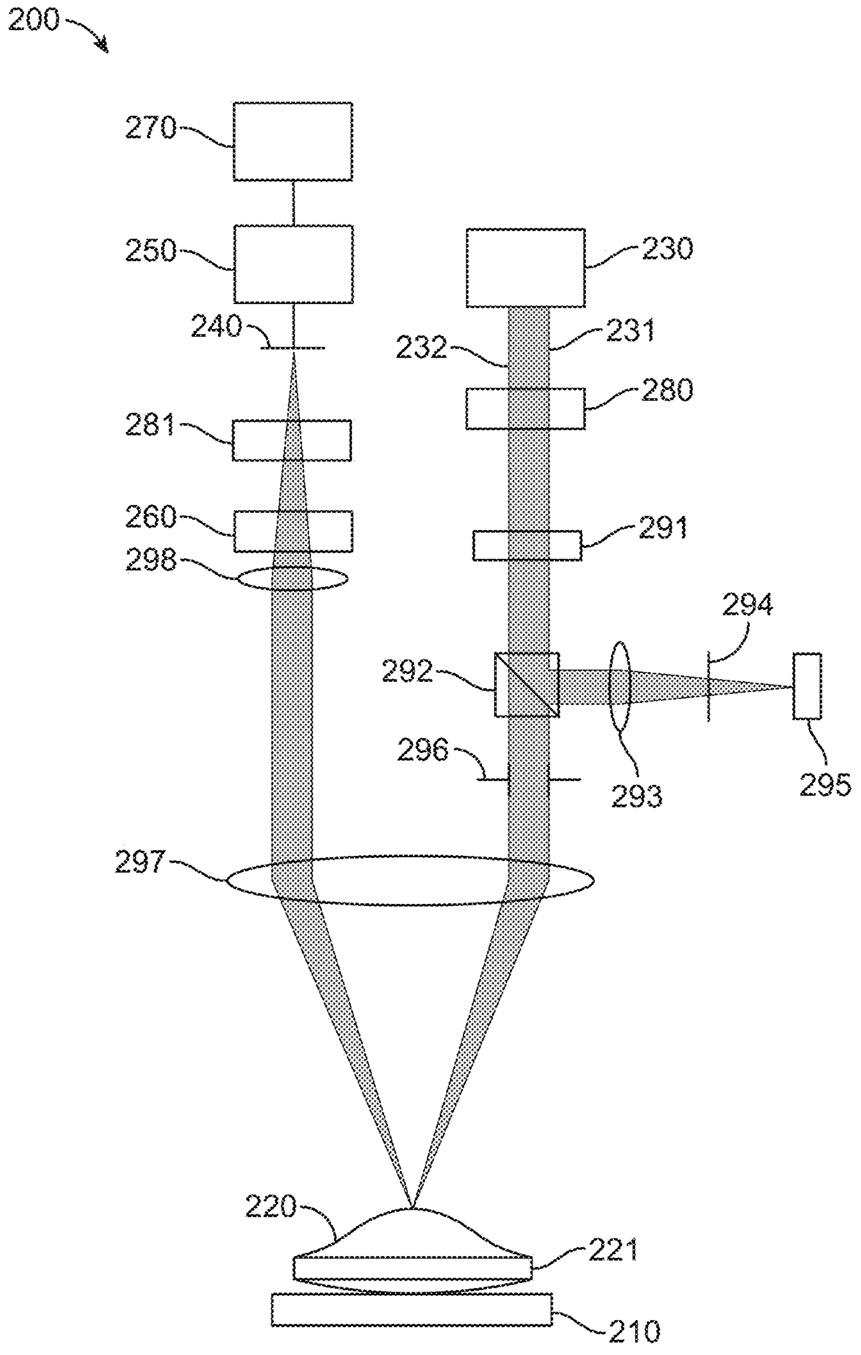
FIG. 2A shows a schematic depicting a first exemplary system for measuring a height property of a surface in a first configuration.

FIG. 2A shows a schematic depicting a first exemplary system 200 for measuring a height property of a surface in a first configuration. In the example shown, the system comprises a rotational module 210 configured to rotate a surface 220 of a part 221 through a plurality of angles. In some embodiments, the surface comprises any surface described herein (such as a surface of an optical component) and the part comprises any part described herein (such as an optical component, an aspheric optical component, or an aspheric lens). In some embodiments, the rotational module comprises a rotating platen. In the example shown in FIG. 2A, the part 221 is mounted on the rotational module 210. However, the part 221 may be attached to a fixture and the fixture may be placed on the rotary module 210. When the part 221 is an optical component, the fixture may be a holding member (for example, a part of a lens barrel) that holds the optical component.

In the example shown, the system comprises an optical source module 230 configured to, for each angle of the plurality of angles, direct a first line of light 231 and a second line of light 232 at the surface. In some embodiments, the first and second lines of light comprise any first and second lines of light described herein.

In the example shown, the system comprises an optical detector 240 configured to, for each angle of the plurality of angles, receive the first and second lines of light and detect an interference pattern between the first and second lines of light. In some embodiments, the first and second lines of light have a shear distance between one another. In some embodiments, the shear distance comprises any shear distance described herein. In some embodiments, the optical detector comprises a line sensor. In some embodiments, a pitch direction of the line sensor is oriented substantially parallel to the shear direction. In some embodiments, the pitch direction of the line sensor is oriented substantially perpendicular to the shear direction. In some embodiments, the line sensor is configured to acquire at least about 1,000 lines/second (l/s) or more. In some embodiments, the line sensor is configured to acquire at most about 100,000 l/s or fewer. In some embodiments, the line sensor is configured to acquire between about 1,000 l/s and about 100,000 l/s.

In the example shown, the system comprises a storage module 250 configured to store the interference pattern associated with each angle of the plurality of angles, thereby generating a plurality of interference patterns. In some embodiments, the system is configured to generate the plurality of interference patterns at any rate described herein.

In the example shown, the system comprises a shear adjustment module 260 configured to introduce the shear distance between the first line of light and the second line of light. In some embodiments, the shear adjustment module comprises a Wollaston prism. In some embodiments, the shear adjustment module is configured to introduce a plurality of shear distances between the first line of light and the second line of light. In some cases, the Wollaston prism is movable and the plurality of shear distances are introduced by moving the Wollaston prism between one or more locations. That is, in some embodiments, each shear distance of the plurality of shear distances is based at least in part on a corresponding location of the Wollaston prism. In some embodiments, the Wollaston prism imparts an angle 2θ between the first line of light and the second line of light. For instance, in some embodiments, the Wollaston prism diverts a first direction of propagation of the first line of light by an angle θ and diverts a second direction of propagation of the second light of light by an equal and opposite angle θ. In some embodiments, the angle 2θ is constant regardless of the location of the Wollaston prism. In some embodiments, the first line of light and the second line of light propagate away from the Wollaston prism at the angle 2θ until received by the optical detector, thereby creating a shear distance $d=z\tan(2\theta)$, where z is the distance between the Wollaston prism and the optical detector. In some embodiments, the shear adjustment module is located between the optical source module and the surface. In some embodiments, the shear adjustment module is located between the surface and the optical detector. In some embodiments, the shear between the first and second lines of light comprises a radial shear. In some embodiments, the shear between the first and second lines of light comprises an azimuthal shear.

In the example shown, the system comprises an analysis module 270. In some embodiments, the analysis module is configured to determine a plurality of differences in surface height between a first plurality of locations on the first line of light and a second plurality of locations on the second line of light. In some embodiments, the analysis module is configured to determine the plurality of differences in surface height based upon the plurality of interference patterns.

In some embodiments, the analysis module is configured to determine the plurality of differences in surface height in any manner described herein. In some embodiments, the analysis module is configured to determine the height property (such as any MSF spectrum or topography of the surface described herein). In some embodiments, the system is configured to determine the height property with any spatial resolution described herein. In some embodiments, the analysis module is configured to determine the height property in any manner described herein. In some embodiments, the analysis module is configured to receive the plurality of interference patterns from the storage module. In some embodiments, the analysis module comprises a computer system, such as a computer system described herein with respect to FIG. 6.

In the example shown, the system comprises a first polarizing module 280 configured to substantially orthogonally polarize the first line of light with respect to the second line of light. In some embodiments, the first polarizing module is located between the optical source module and the surface. In some embodiments, the first polarizing module is configured to polarize the first line of light, the second line of light, or both. Orthogonally polarizing the first and second lines of light may prevent interference between the first and second lines of light prior to construction of the interference pattern at a desired point in space and time. Orthogonally polarizing the first and second lines of light may permit the shear adjustment module (e.g., the Wollaston prism) to create a desired shear distance. In some embodiments, the first polarizing module comprises two polarizers and an amplitude beamsplitter (not shown in FIG. 2A). In some embodiments, the first polarizing module comprises a polarizing beamsplitter (not shown in FIG. 2A). In some embodiments, the first polarizing module comprise two polarization-maintaining (PM) optical fibers combined into one PM fiber using a fiber combiner (FC) (not shown in FIG. 2A). The first and second polarized light may be circularly polarized light. In this case, the first polarized light may be clockwise circularly polarized light and the second polarized light may be counterclockwise circularly polarized light. Further, the first and second polarized light may be elliptical polarized light.

In the example shown, the system comprises a second polarizing module 281 configured to substantially parallelly polarize the first line of light with respect to the second line of light. In some embodiments, the second polarizing module is located between the surface and the optical detector. In some embodiments, the second polarizing module is configured to polarize the first line of light, the second line of light, or both. Parallelly polarizing the first and second lines of light may allow interference between the first and second lines of light at a desired point in space and time. In some embodiments, the second polarizing module comprises a single polarizer. In some embodiments, the second polarizing module comprises a single polarizer oriented substantially halfway between the polarizations of the first and second lines of light.

In some embodiments, the system comprises a variety of conditioning optics. In the example shown, the system comprises an optical path difference (OPD) correction module 291. In some embodiments, the OPD correction module comprises a birefringent element, such as a piece of calcite. In some embodiments, the OPD correction module is configured to correct an OPD between the first and second lines of light.

In the example shown, the system comprises a reference arm comprising a reference beamsplitter 292, a reference focusing lens 293, a reference polarizer 294, and a reference detector 295. In some embodiments, the reference beamsplitter comprises a beam sampler, a beamsplitting mirror, or any other beam pick-off optics. In some embodiments, the reference beamsplitter is configured to pick off small portions of the first and second lines of light and to direct these small portions to the reference focusing lens, reference polarizer, and reference detector to allow analysis of the first and second lines of light. In some embodiments, the reference polarizer is configured to parallelly polarize the first and second lines of line and the reference detector is configured to detect a signal resulting from interference of the first and second lines of light. In some embodiments, the reference detector comprises a single pixel detector (SPD). In some embodiments, the reference detector comprises a reference line sensor. In some embodiments, the reference line sensor is configured to measure a phase difference between the first and second lines of light at a plurality of line sensor measurements. In some embodiments, a signal received by the SPD or the reference line sensor is used to provide feedback about the remainder of the system, allowing real-time optimization of optical alignment, OPD correction, correction for thermal drift of optical components, and the like.

In the example shown, the system comprises an aperture 296 and a sample focusing lens 297 configured to condition and direct the first and second lines of light to the surface. The aperture 296 may be placed on a part of a pupil plane of the sample focusing lens 297. The aperture may be placed on a rear focus plane of the sample focusing lens 297. In the example shown, the sample focusing lens 297 is further configured to receive the first and second lines of light from the surface and to direct the first and second lines of light to a detection focusing lens 298. In some embodiments, the detection focusing lens is configured to condition and direct the first and second lines of light to the detection module. Although depicted as comprising the aperture 296 in FIG. 2A, in some embodiments, the system does not comprise an aperture.

In the example shown, the sample focusing lens is configured to receive the first and second lines of light. However, in some embodiments, the sample focusing lens is configured to receive first and second beams of light (which may have a substantially Gaussian profile) in place of the first and second lines of light, as described herein. In some embodiments, the sample focusing lens is configured to convert the first and second beams of light to the first and second lines of light, as described herein. In some embodiments, the sample focusing lens comprises a cylindrical lens.

In the example shown, the first and second lines of light 231 and 232 are directed toward the first polarizing module 280 by the optical source module 230. The first and second lines of light are incident on the first polarizing module. The first polarizing module orthogonally polarizes the first and second lines of light such that a polarization of the first line of light is orthogonal to a polarization of the second line of light following the interaction of the first and second lines of light with the first polarizing module. The first polarizing module directs the first and second lines of light to the OPD correction module 291. The first and second lines of light are incident on the OPD correction module. The OPD correction module corrects the OPD between the optical paths traveled by the first and second lines of light as they travel through the elements of the system 200. The OPD correction module directs the first and second lines of light to the reference beamsplitter 292. The first and second lines of light are incident on the reference beamsplitter. The reference beamsplitter directs a small portion of each of the first and second lines of light to the reference focusing lens 293. The reference focusing lens receives the small portions of the first and second lines of light and focuses and directs the small portions of the first and second lines of light to the reference polarizer 294. The small portions of the first and second lines of light are incident on the reference polarizer. The reference polarizer polarizes the small portions of the first and second lines of light such that they are polarized in the same direction. The reference polarizer directs the small portions of the first and second lines of light to the reference detector 295. An interference pattern between the small portions of the first and second lines of light is formed at the reference detector. The reference beamsplitter directs a majority of the first and second lines of light to the aperture 296. The first and second lines of light are incident on the pupil. The pupil shapes and conditions the first and second lines of light and directs the first and second lines of light to the sample focusing lens 297. The sample focusing lens receives the first and second lines of light and focuses the first and second lines of light on the surface 220 of the part 221. Here, the condensing state of the first and second beams by the reference focusing lens 293 on the reference detector 295 and the condensing state of the first and second beams by the sample focusing lens 297 on the surface 220 may be substantially the same. The first and second lines of light are reflected by the surface and directed to the focusing lens. The focusing lens receives the first and second lines of light and directs the first and second lines of light to the detection focusing lens 298. The detection focusing lens conditions and focuses the first and second lines of light and directs the first and second lines of light to the shear adjustment module 260. The shear adjustment module receives the first and second lines of light and introduces the shear distance between the first and second lines of light. The shear adjustment module directs the first and second lines of light to the second polarizing module 281. The shear adjustment module may be arranged an image side (or imaging space) of the optical system of the sample focusing lens 297 and the detection focusing lens 298. The second polarizing module polarizes the first and second lines of light such that they are polarized in the same direction. The second polarizing module directs the first and second lines of light to the optical detector 240. The optical detector receives the first and second lines of light, which interfere at the optical detector. Here, the condensing state of the first and second beams by the sample focusing lens 297 on the surface 220 and the condensing state of the first and second beams by the detection focusing lens 298 on a detection surface of the optical detector 240 may be substantially the same. The optical detector thus detects the interference pattern between the first and second lines of light. The optical detector directs the interference pattern to the storage module 250. The storage module receives and stores the interference pattern. This procedure is repeated for each of the plurality of angular orientations of the part 221 as it is rotated by the rotation module 210. This results in a plurality of interference patterns stored by the storage module. The storage module directs the plurality of interference patterns to the analysis module 270. The analysis module determines a plurality of differences in height between the first plurality of locations on the first line of light and the second plurality of locations on the second line of light, as described herein.

Figure 3:
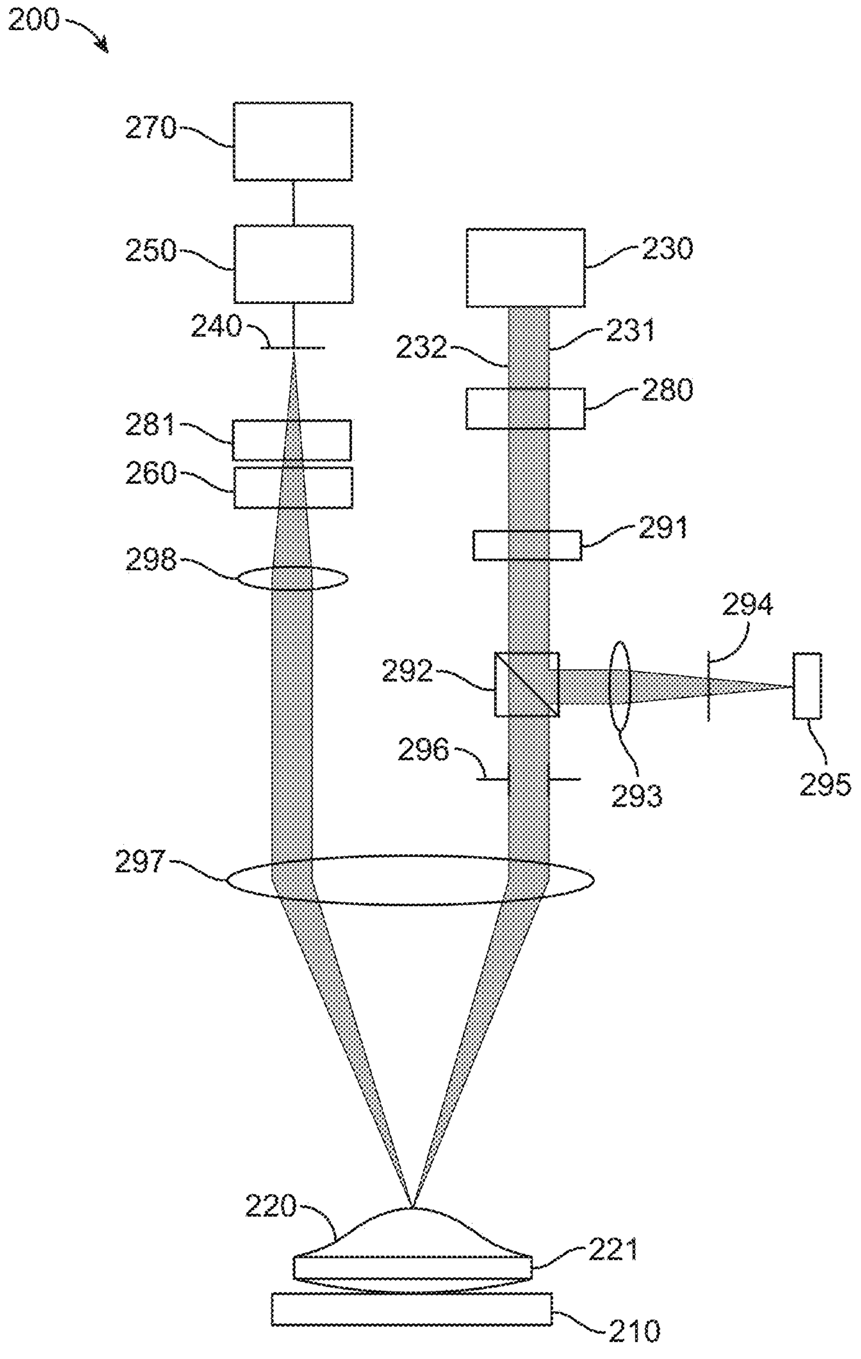
FIG. 3 shows a schematic depicting the first exemplary system for measuring a height property of a surface in a second configuration.

FIG. 3 shows a schematic depicting the first exemplary system 200 for measuring a height property of a surface in a second configuration. In comparison with the configuration shown in FIG. 2A, the configuration shown in FIG. 3 shows the shear adjustment module in a different location. As discussed herein, movement of the shear adjustment module may adjust the shear distance between the first and second lines of light, thereby providing an enhanced measurement of the height property.

Figure 4A:
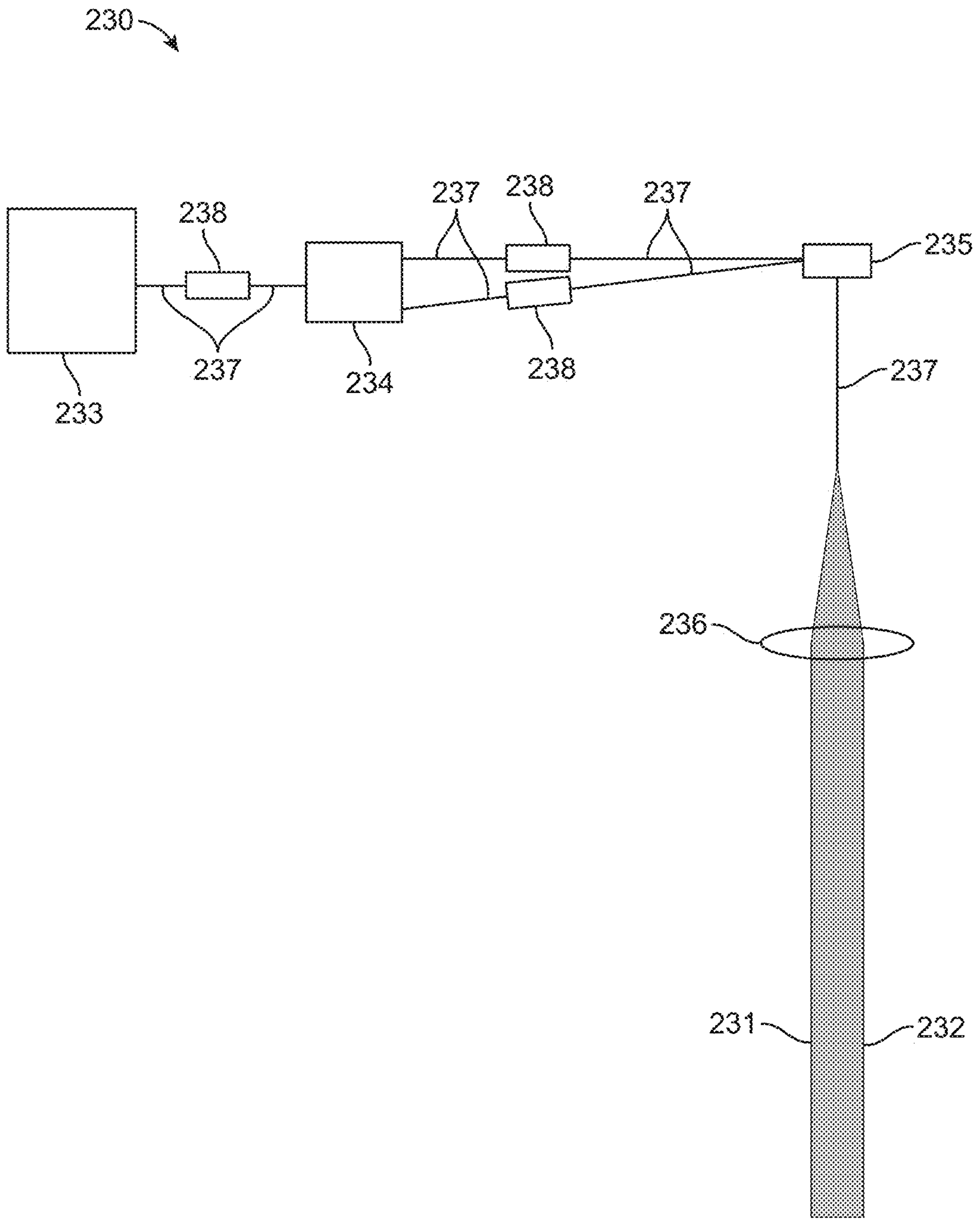
FIG. 4A shows a schematic depicting an exemplary optical source module.

FIG. 4A shows a schematic depicting an exemplary optical source module 230. In the example shown, the optical source module comprises an optical source 233. In some embodiments, the optical source is configured to emit light that will be conditioned by other components of the optical source module to form the first and second lines of light 231 and 232, respectively. In some embodiments, the optical source comprises a light emitting diode (LED). In some embodiments, the optical source comprises a superluminescent diode (SLD). In some embodiments, the optical source emits light comprising a bandwidth of at least about 1 nm or more. In some embodiments, the optical source emits light comprising a bandwidth of at most about 20 nm or less. In some embodiments, the optical source emits light having a bandwidth between about 8 nm and about 14 nm, between about 9 nm and about 13 nm, or between about 10 nm and about 12 nm. In some embodiments, the optical source emits light having any temporal coherence described herein. In some embodiments, the optical source is chosen to have a bandwidth that produces a limited temporal coherence, thereby avoiding problems with spurious reflections from a surface under study, as described herein. In some embodiments, the temporal coherence is any temporal coherence described herein.

In the example shown, the optical source module comprises an acousto-optic frequency shifter (AOFS) 234 configured to receive the light from the optical source, to emit first and second beams of light, and to introduce a frequency or wavelength difference between the first and second beams of light.

Figure 5:
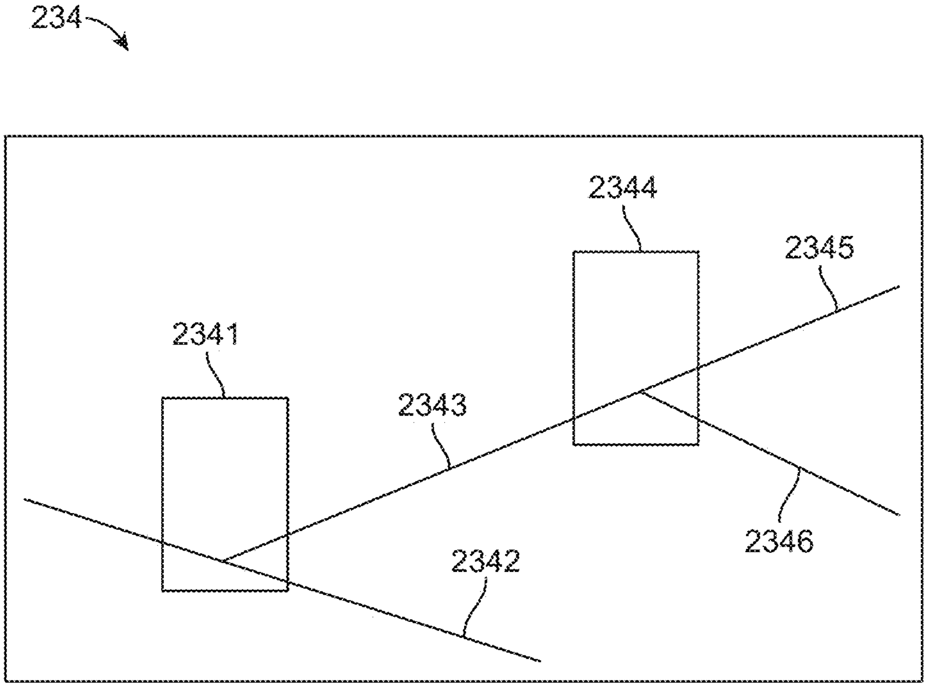
FIG. 5 shows a schematic depicting an exemplary acousto-optic frequency shifter (AOFS).

FIG. 5 shows a schematic depicting an exemplary AOFS 234. In some embodiments, the AOFS comprises a two-channel AOFS. In some embodiments, the first channel 2341 of the AOFS receives light from the optical source and emits a first undeflected beam 2342 and a first deflected beam 2343. In some embodiments, the first deflected beam and the first undeflected beam have a first frequency or wavelength difference. In some embodiments, the first frequency or wavelength difference is significantly greater than desired. For instance, in some embodiments, the first wavelength difference may be greater than 100 pm, due to the physical limitations of acousto-optic effects. However, a much smaller wavelength difference (such as any wavelength difference described herein) may be desired. Thus, in some embodiments, the second channel 2344 of the AOFS receives the first deflected beam from the first channel and outputs a second undeflected beam 2345 and a second deflected beam 2346. In some embodiments, the second channel of the AOFS introduces a second frequency or wavelength difference between the second undeflected beam and the second deflected beam. In some embodiments, the second frequency or wavelength difference has opposite sign from the first frequency or wavelength difference. In some embodiments, the second frequency or wavelength difference is slightly different in magnitude from the first frequency or wavelength difference. In this manner, a slight frequency or wavelength difference may be introduced between the first undeflected beam and the second deflected beam. In some embodiments, the frequency or wavelength difference is any frequency or wavelength difference described herein. In some embodiments, the first and second frequency or wavelength differences are independently electronically tunable. Thus, any desired frequency or wavelength difference may be attained. In some embodiments, the first undeflected beam 2342 and the second deflected beam 2346 form the output of the AOFS shown in FIG. 4A.

Returning to the discussion of FIG. 4A, in some embodiments, the optical source module comprises a first optical source configured to emit the first light beam and a second optical source configured to meet the second light beam (not shown in FIG. 4A). In some embodiments, the first or second optical source comprises an LED, and SLD, or a laser such as a laser diode (LD).

In the example shown, the optical source module comprises a beam combiner 235. In some embodiments, the beam combiner receives the first and second light beams (which may correspond to the first undeflected beam and the second deflected beam described herein) and combines the first and second beams, inducing the first and second beams to travel in a parallel and overlapping manner, but with orthogonal polarization states.

In the example shown, the optical source module comprises a line generating lens 236. In some embodiments, the line generating lens comprises a cylindrical lens. In some embodiments, the line generating lens comprises a Powell lens. In some embodiments, the line generating lines shapes the first and second beams of light into the first and second lines of light described herein. In some embodiments, the line generating lens may have a diffractive optical element or a reflective optics such as a mirror.

In the example shown, the optical source module comprises a variety of fiber optic cables 237 and fiber couplers 238. In some embodiments, the fiber optic cables comprise PM fibers. In some embodiments, the fiber couplers comprise angle polished couplers (APCs). In some embodiments, the fiber optic cables have a length that is selected to correct for any OPD introduced by the AOFS.

Figure 4B:
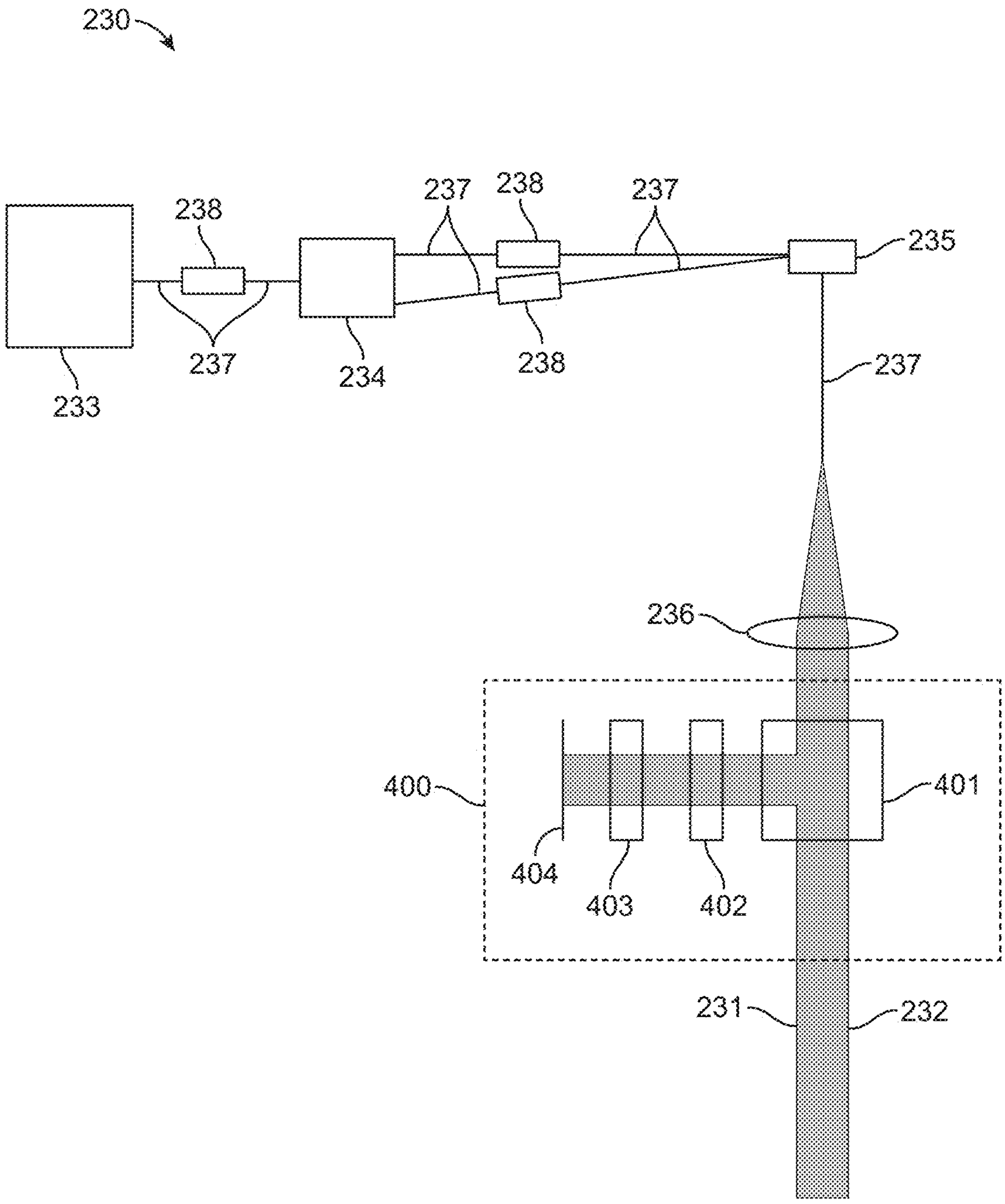
FIG. 4B shows a schematic depicting an exemplary optical source module in combination with a phase difference monitoring module.

FIG. 4B shows a schematic depicting an exemplary optical source module 230 in combination with a phase difference monitoring module 400. In some embodiments, the optical source module comprises any or all of the optical source 233, the AOFS 234, the beam combiner 235, the line generating lens 326, the optical cables 237, and the fiber couplers 238 described herein with respect to FIG. 4A.

In comparison with the optical source module described herein with respect to FIG. 4A, the optical source module of FIG. 4B further comprises the phase difference monitoring module. In some embodiments, the phase difference monitoring module is configured to determine or monitor a phase difference between the first and second lines of light 231 and 232.

In some embodiments, the phase monitoring module comprises a beamsplitter 401. In some embodiments, the beamsplitter is configured to transmit a first portion of the first and second lines of light. In some embodiments, the beamsplitter is configured to reflect a second portion of the first and second beams of light. In some embodiments, the first portion is higher in intensity than the second portion. In some embodiments, the first portion comprises a first intensity of at least about 50%, 55%, 60%, 65%, 70%, 75%, 80%, 85%, 90%, 95%, or more of the intensity of the first and second beams of light. In some embodiments, the second portion comprises a second intensity of at most about 50%, 45%, 40%, 35%, 30%, 25%, 20%, 15%, 10%, 5%, or less of the intensity of the first and second beams of light. In some embodiments, the beamsplitter has a transmission:reflection ratio of at least about 50:50, 55:45, 60:40, 65:35, 70:30, 75:25, 80:20, 85:15, 90:10, 95:5, or more.

In some embodiments, the beamsplitter is configured to direct the second portion of the first and second lines of light to a Wollaston prism 402. In some embodiments, the Wollaston prism is configured to introduce a shear distance between the second portion of the first line of light and the second portion of the second line of light. In some embodiments, the Wallaston prism is configured to introduce a tilt between the second portion of the first line of light and the second portion of the second line of light.

In some embodiments, the Wollaston prism is configured to direct the sheared second portions of the first and second lines of light to a polarizer 403 and to a line sensor 404. In some embodiments, the line sensor is configured to detect a signal indicative of a phase difference between the second portion of the first line of light and the second portion of the second line of light. In some embodiments, such a phase difference is substantially similar to, correlated with, or indicative of a phase difference between the first and second lines of light. In some embodiments, the phase difference is thus indicative of noise associated with drifts in the phase of the optical source. In some embodiments, the line sensor 404 is synchronized in time with the optical detector 240 described herein with respect to FIG. 2A.

In some embodiments, the phase difference is analyzed using an analysis module (such as the analysis module 270 described herein with respect to FIG. 2A, not shown in FIG. 4B). In some embodiments, the analysis module is configured to receive the signal from the line sensor and to perform a Fourier transform (FT) on the signal. In some embodiments, the FT of the signal comprises a spatial frequency peak having a phase $\alpha_i$, where i refers to the time point at which the signal is obtained. In some embodiments, this procedure is repeated to obtain a series of phases corresponding to a series of points in time.

In some embodiments, the analysis module is configured to determine the phase difference between the first and second lines at each time point using a least squares phase shifting interferometry (LSPSI) procedure. In some embodiments, the LSPSI procedure comprises a Schwider-Hariharan (five-step) LSPSI procedure. In some embodiments, the LSPSI procedure comprises, for each time point i, performing a least-squares fitting procedure on the phase $\alpha_i$ using $\alpha_i$ and the phases associated with four other nearby points in time. In some embodiments, matrices $A_i$ and $B_i$ are constructed as follows for each point in time i:

$$A_i = \begin{bmatrix} 5 & \sum_i^{i+4} \cos\alpha_j & \sum_i^{i+4} \sin\alpha_j \\ \sum_i^{i+4} \cos\alpha_j & \sum_i^{i+4} \cos^2\alpha_j & \sum_i^{i+4} \cos\alpha_j \sin\alpha_j \\ \sum_i^{i+4} \sin\alpha_j & \sum_i^{i+4} \cos\alpha_j \sin\alpha_j & \sum_i^{i+4} \sin^2\alpha_j \end{bmatrix}$$

$$B_i = \begin{bmatrix} \sum_i^{i+4} I_j \\ \sum_i^{i+4} I_j \cos\alpha_j \\ \sum_i^{i+4} I_j \sin\alpha_j \end{bmatrix}$$

Here, $I_¿$ denotes the intensity of the signal at the point in time i. In some embodiments, the matrices $A_i$ and $B_i$ are used to calculate the phase difference $\phi_i$ associated with the point in time i according to:

$$A_i^{-1}B_i = \begin{bmatrix} a_{0\_i} \\ a_{1\_i} \\ a_{2\_i} \end{bmatrix}$$

$$\tan \phi_i = a_{2\_i}/a_{1\_i}$$

In some embodiments, the set of phases $\phi_i$ is associated with, correlated with, or indicative of the spatial derivative of the surface described herein. In some embodiments, the phases $\phi_i$ are spatially integrated to determine the phase of the surface at a particular point in time i and a particular location. In some embodiments, the phases $\phi_i$ are subjected to one or more preprocessing operations prior to the spatial integration. In some embodiments, the one or more preprocessing operations are selected from the group consisting of: subtraction of phases measured for a flat optical component, removal of piston terms, removal of tilt terms, correction for an internal angle of the Wollaston prism, and correction of an axial position of the Wollaston prism.

Although described as utilizing a "forward-looking" approach (where the four other nearby points in time are all later time points compared to time point i), the LSPSI procedure may utilize a "backward-looking" approach (where the four other nearby points in time are all earlier time points compared to time point i). For example, the summations above may run from i–4 to i. The LSPSI procedure may utilize a combination of a forward-looking approach and a backward-looking approach. For instance, the summations above may run from i–3 to i+1, i–2 to i+2, or i–1 to i+3. Moreover, the summations may utilize any number of nearby points in time, rather than the four nearby points in time described herein. For instance, the summations may use at least about 7, 9, 11, or more point in time, or at most about 11, 9, or 7 points in time.

Although depicted as utilizing a fiber-based beam combiner in FIGS. 4A and 4B, the optical source modules described herein can instead operate using free-space beam combining components. For instance, the beam combiner 235 may be removed from the optical source modules of FIG. 4A or 4B. Each output from the AOFS 234 may be delivered via optical cables and/or fiber couplers to a corresponding line generating lens or a collimating lens. The outputs from the line generating lenses or the collimating lenses may then be delivered at substantially perpendicular angles to a polarizing beamsplitter, which may combine the outputs and make them collinear. The combined outputs may then be directed to the phase difference monitoring module 400, as described herein.

Additionally, systems are disclosed that can be used to perform the method 100 of FIG. 1 as described above. In some embodiments, the systems comprise one or more processors and memory coupled to the one or more processors. In some embodiments, the one or more processors are configured to implement the operations of method 100. In some embodiments, the memory is configured to provide the one or more processors with instructions corresponding to the operations of method 100. In some embodiments, the instructions are embodied in a tangible computer readable storage medium.

Figure 6:
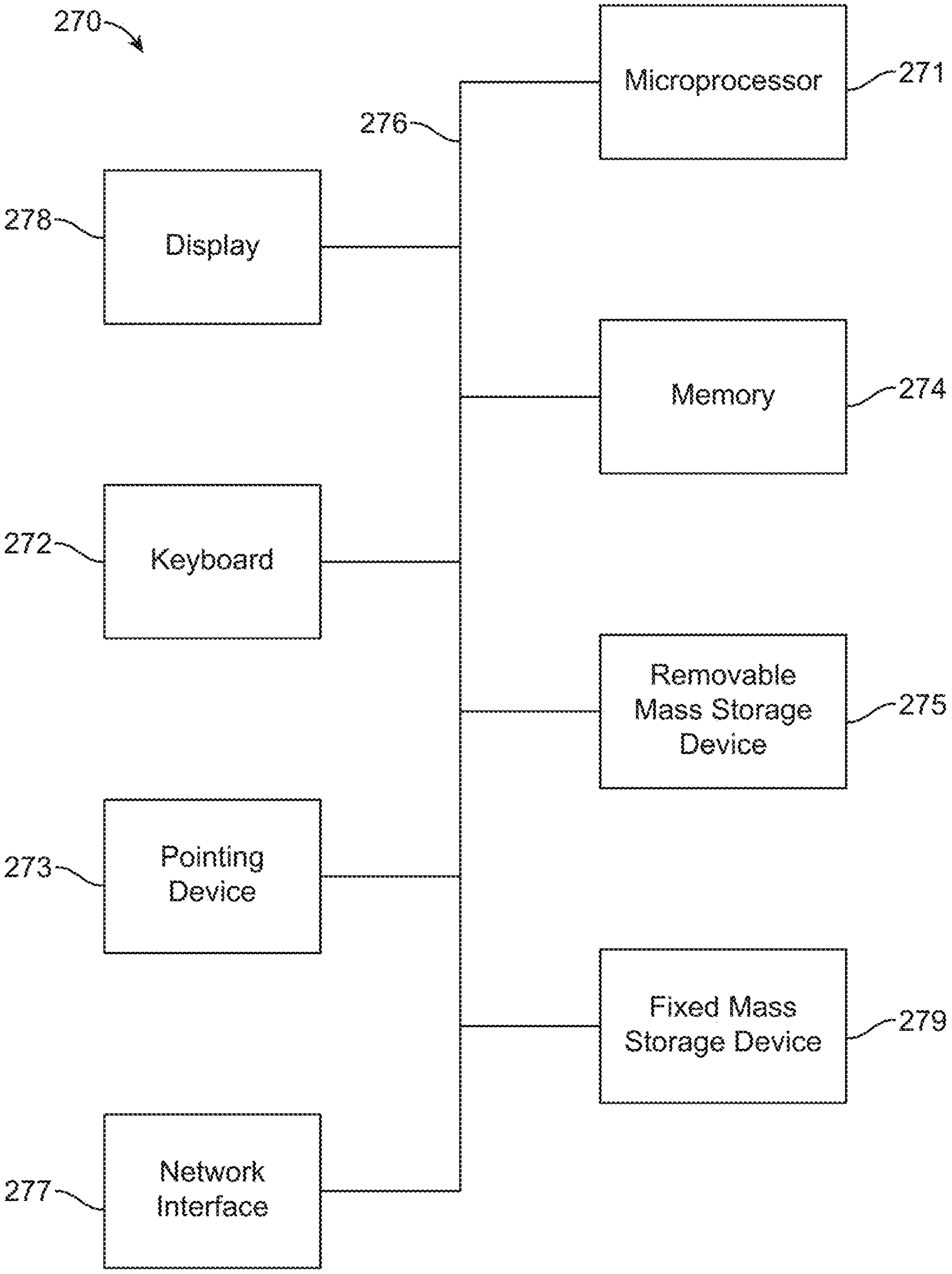
FIG. 6 shows a block diagram of a computer system for measuring a height property of a surface.

FIG. 6 is a block diagram of a computer system 270 used in some embodiments to perform portions of methods for measuring a height property of a surface described herein (such as step 180 of method 100 as described herein with respect to FIG. 1). In some embodiments, the computer system may be utilized as a component in systems for measuring a height property of a surface described herein (such as analysis module 270 described herein with respect to FIG. 2A). FIG. 6 illustrates one embodiment of a general purpose computer system. Other computer system architectures and configurations can be used for carrying out the processing of the present invention. Computer system 270, made up of various subsystems described below, includes at least one microprocessor subsystem 271. In some embodiments, the microprocessor subsystem comprises at least one central processing unit (CPU) or graphical processing unit (GPU). The microprocessor subsystem can be implemented by a single-chip processor or by multiple processors. In some embodiments, the microprocessor subsystem is a general purpose digital processor which controls the operation of the computer system 270. Using instructions retrieved from memory 274, the microprocessor subsystem controls the reception and manipulation of input data, and the output and display of data on output devices.

The microprocessor subsystem 271 is coupled bi-directionally with memory 274, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also as well known in the art, primary storage typically includes basic operating instructions, program code, data and objects used by the microprocessor subsystem to perform its functions. Primary storage devices 274 may include any suitable computer-readable storage media, described below, depending on whether, for example, data access needs to be bi-directional or uni-directional. The microprocessor subsystem 271 can also directly and very rapidly retrieve and store frequently needed data in a cache memory (not shown).

A removable mass storage device 275 provides additional data storage capacity for the computer system 270, and is coupled either bi-directionally (read/write) or uni-directionally (read only) to microprocessor subsystem 271. Storage 275 may also include computer-readable media such as magnetic tape, flash memory, signals embodied on a carrier wave, PC-CARDS, portable mass storage devices, holographic storage devices, and other storage devices. A fixed mass storage 279 can also provide additional data storage capacity. The most common example of mass storage 279 is a hard disk drive. Mass storage 275 and 279 generally store additional programming instructions, data, and the like that typically are not in active use by the processing subsystem. It will be appreciated that the information retained within mass storage 275 and 279 may be incorporated, if needed, in standard fashion as part of primary storage 274 (e.g. RAM) as virtual memory.

In addition to providing processing subsystem 271 access to storage subsystems, bus 276 can be used to provide access other subsystems and devices as well. In the described embodiment, these can include a display monitor 278, a network interface 277, a keyboard 272, and a pointing device 273, as well as an auxiliary input/output device interface, a sound card, speakers, and other subsystems as needed. The pointing device 273 may be a mouse, stylus, track ball, or tablet, and is useful for interacting with a graphical user interface.

The network interface 277 allows the processing subsystem 271 to be coupled to another computer, computer network, or telecommunications network using a network connection as shown. Through the network interface 277, it is contemplated that the processing subsystem 271 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 271 can be used to connect the computer system 270 to an external network and transfer data according to standard protocols. That is, method embodiments of the present invention may execute solely upon processing subsystem 271, or may be performed across a network such as the Internet, intranet networks, or local area networks, in conjunction with a remote processing subsystem that shares a portion of the processing. Additional mass storage devices (not shown) may also be connected to processing subsystem 271 through network interface 277.

An auxiliary I/O device interface (not shown) can be used in conjunction with computer system 270. The auxiliary I/O device interface can include general and customized interfaces that allow the processing subsystem 271 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter. The computer system shown in FIG. 6 is but an example of a computer system suitable for use with the invention. Other computer systems suitable for use with the invention may include additional or fewer subsystems. In addition, bus 276 is illustrative of any interconnection scheme serving to link the subsystems. Other computer architectures having different configurations of subsystems may also be utilized.

Figure 7:
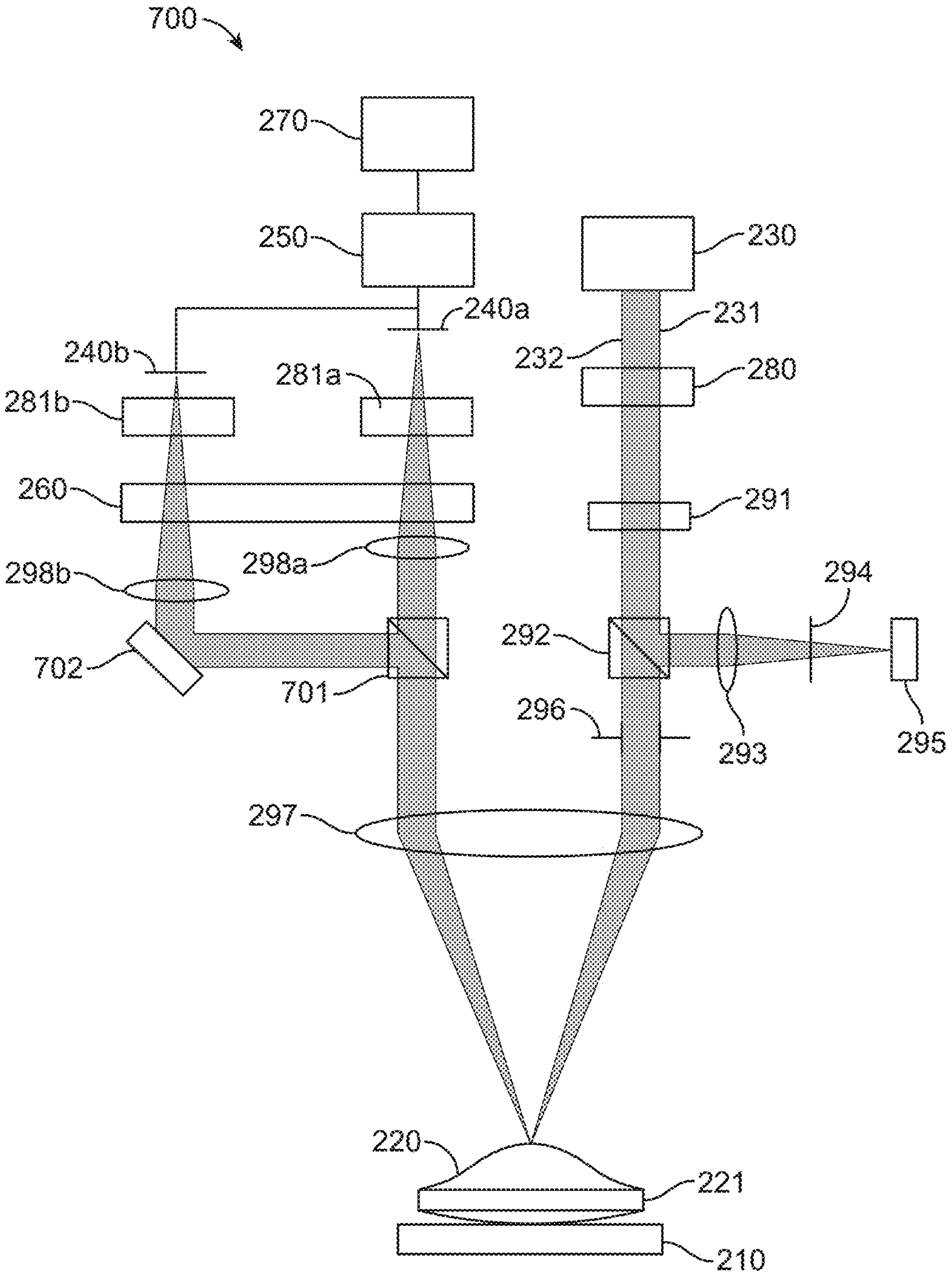
FIG. 7 shows a schematic depicting a second exemplary system for measuring a height property of a surface.

FIG. 7 shows a schematic depicting a second exemplary system 700 for measuring a height property of a surface. In comparison with the system 200 of FIG. 2A, the system 700 shown in FIG. 7 utilizes first and second beam paths between the sample focusing lens and the storage module. In some embodiments, the first and second beam paths allow simultaneous measurement of a first plurality of interference patterns using a first radial shear distance and a second plurality of interference patterns using a second radial shear distance. In this manner, two radial shear distances may be obtained simultaneously, further speeding up measurement of the height property of the surface. For instance, as described herein with respect to FIG. 1, when using a single shear distance, certain spatial frequencies (such as those corresponding to multiples of the Nyquist rate of the shear distance) may not be sampled. By utilizing multiple simultaneous measurements with different shear distances, the otherwise missing spatial frequencies may be obtained. In particular, using the first and second beam paths described in FIG. 7 may allow the simultaneous acquisition of all relevant spatial frequency content.

The system 700 may be similar to system 200 described herein with respect to FIG. 2A. In the example shown, the system comprises a rotational module 210, a surface 220, a part 221, an optical source module 230, first and second lines of light 231 and 232, a storage module 250, a shear adjustment module 260, an analysis module 270, a first polarizing module 280, an OPD correction module 291, a reference beamsplitter 292, a reference focusing lens 293, a reference polarizer 294, a reference detector 295, an aperture 296, and a sample focusing lens 297, each of which may be similar to a corresponding element described herein with respect to FIG. 2A.

In comparison with the system of FIG. 2A, the system 700 comprises a beamsplitter 701 configured to direct the first and second lines of light along first and second beam paths. In some embodiments, the first beam path comprises a first detection focusing lens 298*a*, the shear adjustment module 260, a first polarizing module 281*a*, and a first optical detector 240*a*. In some embodiments, the first detection focusing lens is similar to any detection focusing lens described herein with respect to FIG. 2A. In some embodiments, the first polarizing module is similar to any polarizing module described herein with respect to FIG. 2A. In some embodiments, the first optical detector is similar to any optical detector described herein with respect to FIG. 2A. In some embodiments, the first detection focusing lens, the shear adjustment module, the first polarizing module, and the first optical detector are aligned to produce the first plurality of interference patterns using the first shear distance. In some embodiments, the first optical detector is configured to detect the first plurality of interference patterns.

In some embodiments, the second beam path comprises a second detection focusing lens 298*b*, the shear adjustment module 260, a second polarizing module 281*b*, and a second optical detector 240*b*. In some embodiments, the second detection focusing lens is similar to any detection focusing lens described herein with respect to FIG. 2A. In some embodiments, the second polarizing module is similar to any polarizing module described herein with respect to FIG. 2A. In some embodiments, the second optical detector is similar to any optical detector described herein with respect to FIG. 2A. In some embodiments, the second detection focusing lens, the shear adjustment module, the second polarizing module, and the second optical detector are aligned to produce the second plurality of interference patterns using the second shear distance. In some embodiments, the second optical detector is configured to detect the second plurality of interference patterns.

In some embodiments, the system comprises a mirror 702. In some embodiments, the mirror is located along the first beam path. In some embodiments, the mirror is located along the second beam path.

In some embodiments, the storage module is configured to receive the first plurality of interference patterns from the first optical detector and the second plurality of interference patterns from the second optical detector.

Figure 8:
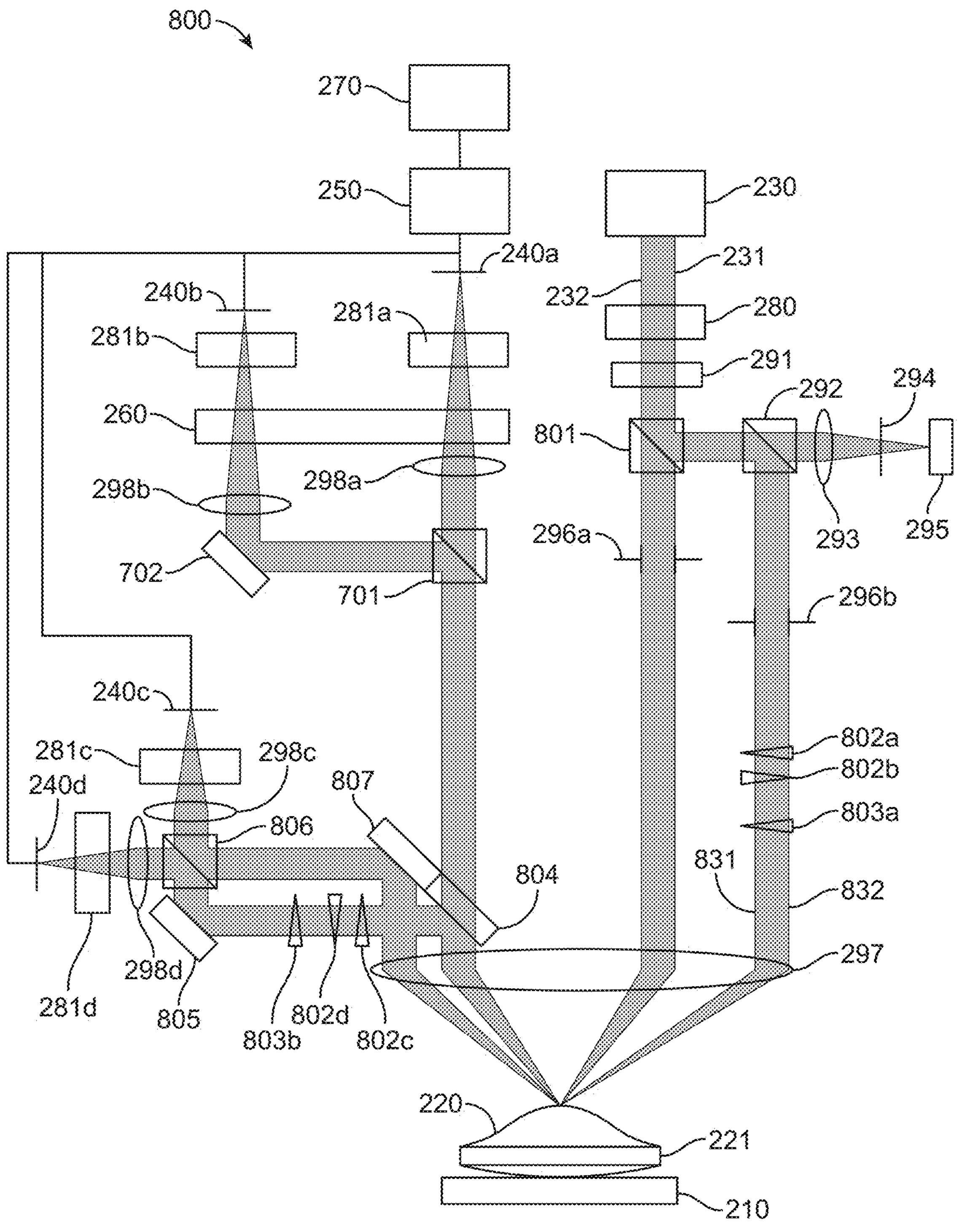
FIG. 8 shows a schematic depicting a third exemplary system for measuring a height property of a surface.

FIG. 8 shows a schematic depicting a third exemplary system 800 for measuring a height property of a surface. In comparison with the system 700 of FIG. 7, the system 800 shown in FIG. 8 utilizes a third beam path between the OPD correction module and the sample focusing lens. In some embodiments, the third beam path allows simultaneous measurement of two radial shear distances (as described herein with respect to FIG. 7), while also allowing measurement of two azimuthal shear distances. In this manner, the height property of the surface may be determined with greater precision in both the radial and azimuthal directions.

The system 800 may be similar to system 700 described herein with respect to FIG. 7. In the example shown, the system comprises a rotational module 210, a surface 220, a part 221, an optical source module 230, first and second lines of light 231 and 232, a storage module 250, a shear adjustment module 260, an analysis module 270, a first polarizing module 280, an OPD correction module 291, a reference beamsplitter 292, a reference focusing lens 293, a reference polarizer 294, a reference detector 295, a sample focusing lens 297, a beamsplitter 701, a mirror 702, a first detection focusing lens 298*a*, a first polarizing module 281*a*, a first optical detector 240*a*, a second detection focusing lens 298*a*, a second polarizing module 281*b*, and a second optical detector 240*b*, each of which may be similar to a corresponding element described herein with respect to FIG. 7.

In the example shown, the system comprises a radial-azimuthal beamsplitter 801. In some embodiments, the radial-azimuthal beamsplitter is configured to split the first line of light to generate a third line of light 831 and to split the second line of light to generate a fourth line of light 832. In some embodiments, the radial-azimuthal beamsplitter is configured to reflect about 25% of the first and second lines of light to create the third and fourth lines of light, respectively. In some embodiments, the radial-azimuthal beamsplitter is configured to transmit about 75% of the first and second lines of light. In some embodiments, the third line of light comprises the same frequency or wavelength as the first line of light. In some embodiments, the fourth line of light comprises the same frequency or wavelength as the second line of light.

In some embodiments, the system further comprises a first aperture 296*a* and a second aperture 296*b*, each of which may be similar to any aperture described herein. In some embodiments, the system further comprises an azimuthal shear module configured to introduce a first azimuthal shear distance between the first line of light and the fourth line of light. In some embodiments, the azimuthal shear module is configured to introduce a second azimuthal shear distance between the second line of light and the third line of light. In some embodiments, the azimuthal shear module comprises a Risley prism comprising a first wedge 802*a* and a second wedge 802*b* and a first birefringent wedge 803*a*. In some embodiments, the first and second wedges have substantially equal refractive indices that are used to steer the third and fourth lines of light around an optical axis of the Risley prism. In some embodiments, the first and second wedges are independently rotatable. In some embodiments, independent rotation of the first and second wedges permits the third and fourth lines of light to be steered along any elevation angle and/or any azimuthal angle. In some embodiments, the first and second wedges introduce an angle difference between the third and fourth lines of light, so that the third and fourth lines of light are directed to different positions or locations on the surface, thereby introducing the azimuthal shear between third and fourth lines of light. In some embodiments, the first and second azimuthal shear distances are different. In some embodiments, the first azimuthal shear distance comprises any shear distance described herein. In some embodiments, the second azimuthal shear distance comprises any shear distance described herein.

In some embodiments, the first, second, third, and fourth lines of light are directed through the sample focusing lens 270. In some embodiments, the first, second, third, and fourth lines of light are reflected from different locations on the surface based on the first radial shear distance, the second radial shear distance, the first azimuthal shear distance, and the second azimuthal shear distance. In some embodiments, the first and second lines of light are reflected from the surface and directed to a partially reflective mirror 804. In some embodiments, the partially reflective mirror is configured to transmit a portion of the first line of light and a portion of the second line of light to the beamsplitter 701. In some embodiments, the partially reflective mirror is configured to transmit about 67% of the first and second lines of light.

In some embodiments, the beamsplitter 701 is configured to direct a first portion of the first line of light and a first portion of a second line of light to the first polarizing module 281*a*, first detection focusing lens 298*a*, and first optical detector 240*a*. In some embodiments, the beamsplitter 701 is configured to direct a second portion of the first line of light and a second portion of the second line of light to the second polarizing module 281*b*, second detection focusing lens 298*b*, and second optical detector 240*b*. In some embodiments, the first optical detector is configured to receive the first portion of the first line of light and the first portion of the second line of light and detect a first interference pattern between the first portion of the first line of light and the first portion of the second line of light. In some embodiments, the second optical detector is configured to receive the second portion of the first line of light and the second portion of the second line of light and detect a second interference pattern between the second portion of the first line of light and the second portion of the second line of light.

In some embodiments, the partially reflective mirror is configured to reflect a third portion of the first line of light and a third portion of the second line of light. In some embodiments, the partially reflective mirror is configured to direct the third portion of the first line of light and the third portion of the second line of light to an OPD correction module. In some embodiments, the OPD correction module is configured to match an OPD between the fourth line of light and the third portion of the first line of light. In some embodiments, the OPD correction module is configured to match an OPD between the third line of light and the third portion of the second line of light. In some embodiments, the OPD correction module comprises a Risley prism comprising a third wedge 802*c* and a fourth wedge 802*d* and a second birefringent wedge 803*b*. In some embodiments, the first and second wedges are matched to the third and fourth wedges. In some embodiments, the first birefringent wedge is matched to the second birefringent wedge. In some embodiments, the third wedge, the fourth wedge, and the second birefringent wedge substantially match the OPD described herein by introducing an optical path length (OPL) that is substantially equal to an OPL introduced by the first wedge, the second wedge, and the first birefringent wedge described herein. In some embodiments, the partially reflective mirror is configured to reflect about 33% of the first and second lines of light.

In some embodiments, the system comprises a first fold mirror 805 configured to direct the third portion of the first line of light and the third portion of the second line of light to an azimuthal shear beamsplitter 806. In some embodiments, the azimuthal shear beamsplitter comprises a polarizing beamsplitter. In some embodiments, the system comprises a second fold mirror 807 configured to direct the third and fourth lines of light to the azimuthal shear beamsplitter. In some embodiments, the second fold mirror 807 and the partially reflective mirror 804 may be constructed from a single substrate, as shown in FIG. 8.

In some embodiments, the azimuthal beamsplitter is configured to direct the fourth line of light and the third portion of the first line of light to a third polarizing module 281*c*, a third detection focusing lens 298*c*, and a third optical detector 240*c*, each of which may be similar to any polarizing module, detection focusing lens, and optical detector, respectively, described herein. In some embodiments, the azimuthal beamsplitter is configured to direct the third line of light and the third portion of the second line of light to a fourth polarizing module 281*d*, a fourth detection focusing lens 298*d*, and a fourth optical detector 240*d*, each of which may be similar to any polarizing module, detection focusing lens, and optical detector, respectively, described herein. In some embodiments, the third optical detector is configured to receive the fourth line of light and the third portion of the first line of light and detect a third interference pattern between the fourth line of light and the third portion of the first line of light. In some embodiments, the fourth optical detector is configured to receive the third line of light and the third portion of the second line of light and detect a fourth interference pattern between the third line of light and the third portion of the second line of light. In some embodiments, the first and second interference patterns comprise information relating to a height profile of the surface along a radial direction of the surface. In some embodiments, the third and fourth interference patterns comprise information relating to a height profile of the surface along an azimuthal direction of the surface.

In some embodiments, the storage module is configured to store the first interference pattern associated with each angle of the plurality of angles, thereby generating a first plurality of interference patterns. In some embodiments, the storage module is configured to store the second interference pattern associated with each angle of the plurality of angles, thereby generating a second plurality of interference patterns. In some embodiments, the storage module is configured to store the third interference pattern associated with each angle of the plurality of angles, thereby generating a third plurality of interference patterns. In some embodiments, the storage module is configured to store the fourth interference pattern associated with each angle of the plurality of angles, thereby generating a fourth plurality of interference patterns. In some embodiments, the analysis module is configured to determine the height property of the surface based upon the first plurality of interference patterns, the second plurality of interference patterns, the third plurality of interference patterns, and the fourth plurality of interference patterns.

In some embodiments, the first and third lines of light comprise a first frequency or wavelength, which may be any frequency or wavelength described herein. In some embodiments, the second and fourth lines of light comprise a second frequency or wavelength, which may be any frequency or wavelength described herein. In some embodiments, the first and second frequencies or wavelengths are different. In some embodiments, the first portion of the first line of light comprises a first polarization. In some embodiments, the first portion of the second line of light comprises a second polarization. In some embodiments, the first and second polarizations are different. In some embodiments, the second portion of the first line of light comprises a first polarization. In some embodiments, the second portion of the second line of light comprises a second polarization. In some embodiments, the first and second polarizations are different. In some embodiments, the third portion of the first line of light comprises a first polarization. In some embodiments, the fourth line of light comprises a second polarization. In some embodiments, the first and second polarizations are different. In some embodiments, the third portion of the second line of light comprises a first polarization. In some embodiments, the third line of light comprises a second polarization. In some embodiments, the first and second polarizations are different. In some embodiments, the system comprises one or more Wollaston prisms (not shown in FIG. 8) configured to increase an angular separation imparted by the OPD correction module. In some embodiments, increasing the angular separation prevents stray light having the wrong polarization from being received by the third or fourth optical detector. For instance, in some embodiments, increasing the angular separation deflects stray light having the wrong polarization beyond the detection limits of a line sensor. In some embodiments, the system comprises one Wollaston prism. In some embodiments, the system comprises a pair of matched Wollaston prisms. In some embodiments, the one or more Wollaston prisms are located between the OPD correction module and the azimuthal shear beamsplitter. In some embodiments, the system comprises one or more half-wave plates (HWPs, not shown in FIG. 8) configured to ensure that light of the property polarization is correctly aligned at each of the third and fourth optical detectors. In some embodiments, the system comprises one HWP. In some embodiments, the system comprises two HWPs. In some embodiments, an HWP is located between the OPD correction module and the azimuthal shear beamsplitter. In some embodiments, an HWP is located between the optical source module and the azimuthal shear module.

In the example shown in FIG. 8, the distances between the locations on the surface at which the first and second lines of light are directed, or the distances between the locations on the surface at which the third and fourth lines of light are direction, is not shown to scale. Rather, the distances are exaggerated in order to illustrate the detection concept. In some embodiments, the distances between the first and second lines of light, or between the third and fourth lines of light, is at least about 0 μm, 5 μm, or more. In some embodiments, the distances between the first, second, third, and fourth lines of light is at most about 500 μm or less. In some embodiments, the distances between the first, second, third, and fourth lines of light is between about 5 μm and about 500 μm.

The systems and methods described herein with respect to FIGS. 1-8 may be configured to detect a variety of slopes of features on the surface within a field of view (FOV) of the system for a single angle of the surface. For example, in some embodiments, the systems and methods described herein are configured to detect a surface slope of at least about +/−0.5° or more. In some embodiments, the systems and methods described herein are configured to detect a surface slope of at most about +/−10° or less. In some embodiments, the systems and methods herein are configured to detect a surface slope between about +/−0.5° and about +/−10°

Although the systems and methods are described as utilizing a rotational module in the description of FIGS. 1-8, the systems and methods described herein may instead utilize linear motion to direct the first and second lines of light at different locations on the surface. For instance, the systems and methods described herein may operate by positioning the surface at a plurality of different locations instead of rotating the surface. Alternatively or in combination, the systems and methods may utilize motion of the optical components described herein in addition to or in place of motion of the surface. In this manner, the systems and methods may be applied to measuring a height property of a surface that is not easily amenable to rotation, such as a wing of an aircraft. The systems and methods may be utilized to measure a height property such as a pattern of aerodynamic riblets on the wing. For example, in some embodiments, a surface comprising a plurality of riblets may be moved in a linear direction of motion relative to the optical components described herein. In some embodiments, the optical components are moved in a linear direction of motion relative to the surface comprising the plurality of riblets. In some embodiments, the shear distance between the first and second lines of light is about equal to one half of a repetition period of the riblets on the surface. In some embodiments, a shear distance of about one half of the repetition period provides sensitivity to a height of the plurality of riblets. In some embodiments, the shear distance between the first and second lines of light is about equal to the repetition period of the riblets on the surface. In some embodiments, a shear distance of about the repetition period provides sensitivity to variability from one riblet of the plurality to another riblet of the plurality. Examples of riblets are disclosed, for example, in U.S. Pat. Nos. 4,706,910, 4,863,121, 4,907,765, 4,930,729, 5,133,519, 5,386,955, 5,542,630, 6,345,791, 6,729,846, 8,220,754, 8,413,928, 8,444,092, 8,460,779, 8,684,310, 9,272,791, 9,297,394, 9,751,618, 9,844,906, 10,422,363, 10,450,867, 10,569,365, and 10,882,605, and in U.S. Patent Application Publication Nos. 2021/0054859, 2018/0079492, and 2018/0283180, each of which are entirely incorporated herein by reference for all purposes.

As such, provided herein is a method for measuring a surface property of a surface, comprising: (a) for each location of a plurality of locations: (i) positioning the surface at the location; (ii) directing a first line of light at the surface; (iii) directing a second line of light at the surface; (iv) receiving the first and second lines of light; and (v) detecting an interference pattern between the first and second lines of light; (b) generating a plurality of interference patterns; and (c) determining the height property of the surface based upon the plurality of interference patterns. In some embodiments, the first and second lines of light have a shear distance between one another. In some embodiments, each interference pattern of the plurality of interference patterns corresponds to a location of the plurality of locations. In some embodiments, the surface comprises a surface of a wing. In some embodiments, the wing comprises a plurality of aerodynamic riblets. In some embodiments, the method comprises any or all of operations 110, 120, 130, 140, 150, 160, 170, and 180 described herein with respect to FIG. 1, with the exception that any reference to rotating be replaced by positioning and any reference to an angle be replaced by a location. When measuring the riblets, the riblets may be measured in the first posture with respect to the optical axis of the optical system that projects the first and second lines of light to the surface, and then the riblets may be measured in the second posture. Here, the posture of the riblets may be the angle between the normal line of the surface on which the riblets are provided and the optical axis.

Figure 2B:
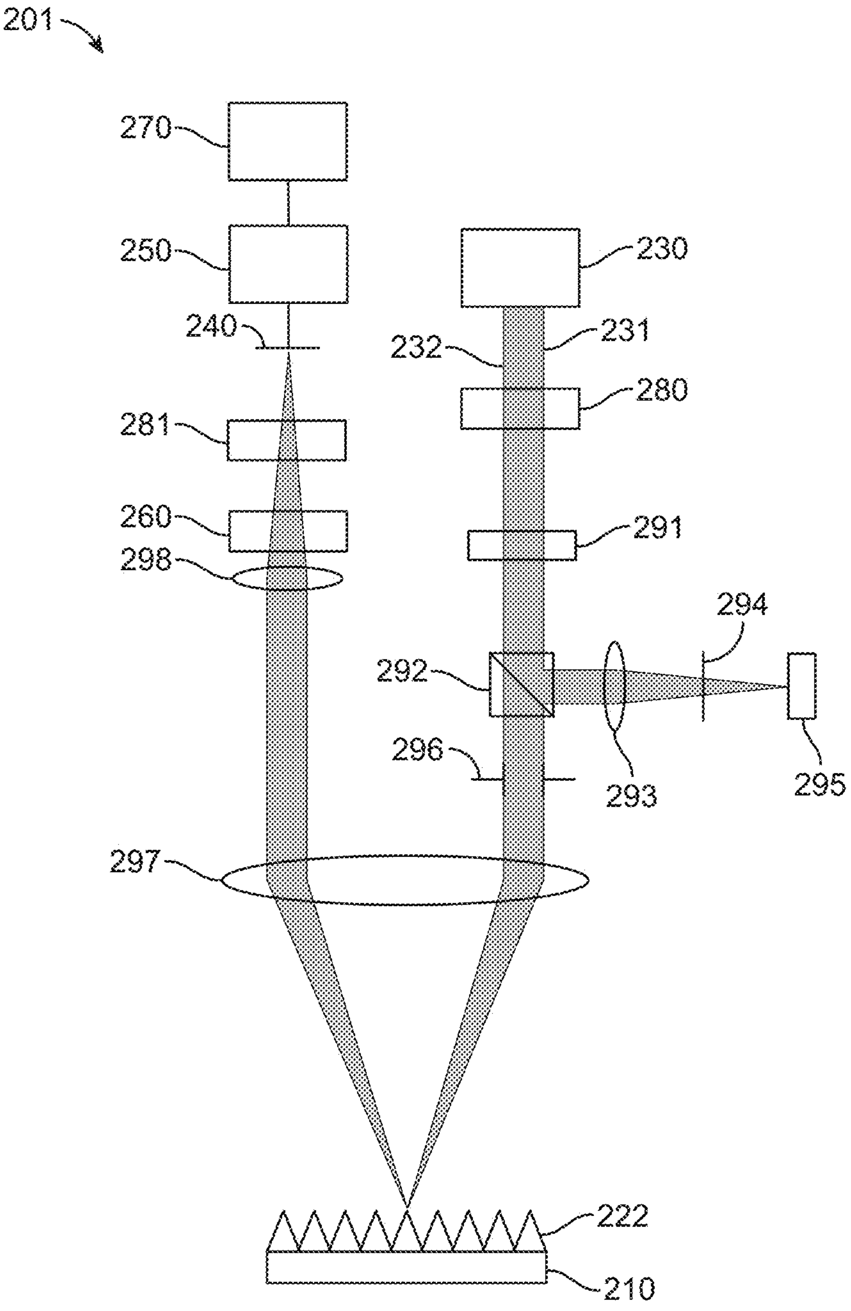
FIG. 2B shows a schematic depicting a first exemplary system for measuring a height property of a surface comprising riblets in a first configuration.

FIG. 2B shows a schematic depicting an exemplary system 201 for measuring a height property of a surface comprising riblets. The system 201 may be similar to systems 200, 700, or 800 described herein with respect to FIG. 2A and FIGS. 3-8. In comparison to the system 200 shown in FIG. 2A, the system 201 directs the first and second lines of light at a plurality of riblets 222.

Further provided herein is a system from measuring a height property of a surface, comprising a positioning module, an optical source module, an optical detector, and a storage module. In some embodiments, the positioning module is configured to position the surface at a plurality of locations. In some embodiments, the optical source module is configured to, for each location of the plurality of locations, direct a first line of light and a second line of light at the surface. In some embodiments, the optical detector is configured to, for each location of the plurality of locations, receive the first and second lines of light and detect and interference between the first and second lines of light. In some embodiments, the first and second lines of light have a shear distance between one another. In some embodiments, the system comprises any or all elements described herein with respect to FIGS. 2-8, with the exception that any reference to the rotational module be replaced by the positioning module.

In the examples shown in FIGS. 2A, 2B, 3, 4A, 4B, 7, and 8, the optical source module is configured to generate the first and second lines of light. However, in some embodiments, the optical source module is configured to generate first and second beams of light. In some embodiments, the first and second beams of light have a substantially Gaussian profile. In some embodiments, the first and second beams of light are converted into first and second lines of light using a cylindrical lens, as described herein. In some embodiments, the optical source module comprises the cylindrical lens (not shown in FIG. 2A, 2B, 3, 4A, 4B, 7, or 8). However, in some embodiments, the cylindrical lens is distinct from the optical source module. For instance, in some embodiments, the sample focusing lens described herein comprises a cylindrical lens. Thus, reference herein to a "line of light" shall generally be understood as describing either a line of light or a beam of light (which may have an approximately Gaussian profile). However, one having skill in the art will recognize that the phrase "line of light" shall convey only a line of light when used to refer to interactions with the surface described herein, as well as to interactions with components described herein that are located after the surface on a direction of propagation of the lines of light. That is, the beams of light must generally be converted to lines of light prior to their interaction with the surface or prior to their interaction with optical components of the system that are optically conjugate to the surface. In general, the beams of light may be converted to lines of light anywhere along the optical train between the optical source module and the surface described herein.

EXAMPLES

Figure 9:
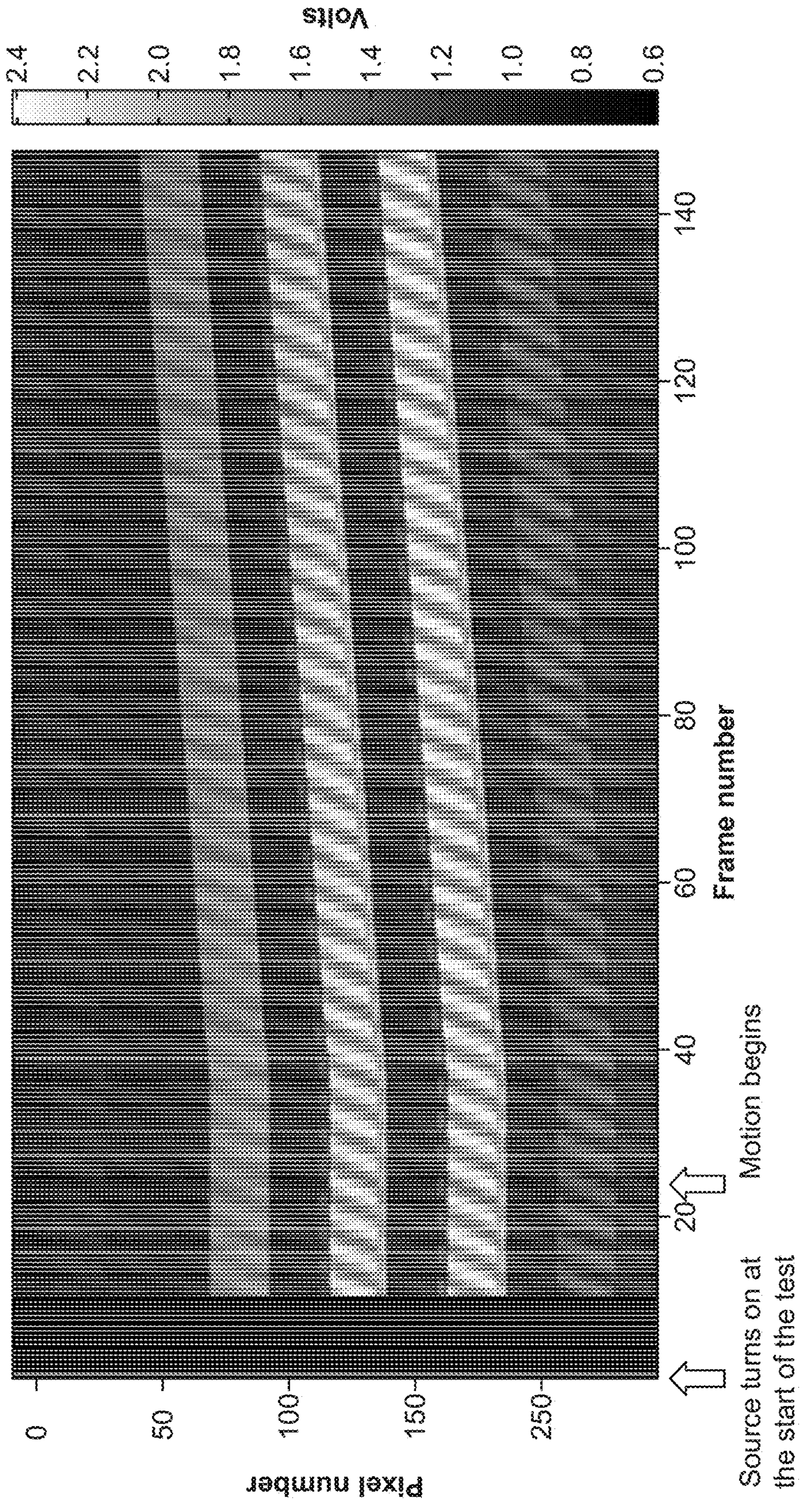
FIG. 9 depicts an example of interference patterns associated with a bar target.

FIG. 9 depicts an example of interference patterns associated with a chrome bar target on a glass substrate. In this example, the optical detector comprised a line sensor which registered optical signals at a plurality of pixels. The optical detector was turned on at frame 1 and allowed to detect frames throughout the experiment. The surface started translating parallel to a long dimension of the line sensor between frames 35 and 40. Once motion started, the bar targets detected by the pixels of the optical detector began to shift in position. The fringes changed position for each line on the line sensor due to the heterodyne nature of the light source. In some embodiments, the interference patterns depicted in FIG. 9 are used to determine the LSPSI phases described herein for the chrome bar target on the glass substrate.

Figure 10:
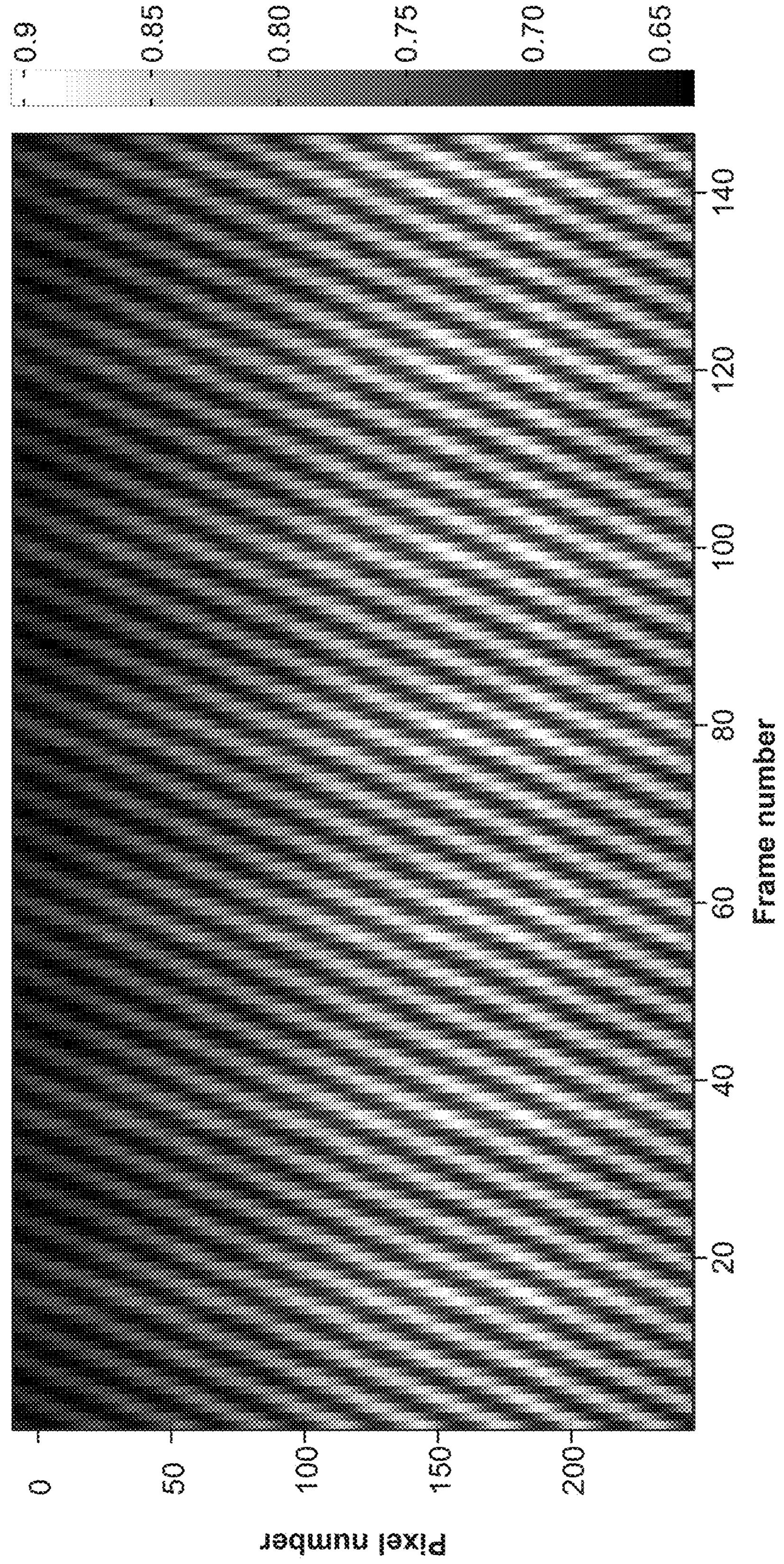
FIG. 10 depicts an example of interference patterns associated with a piece of bare glass.

FIG. 10 depicts an example of interference patterns associated with a piece of bare glass. The experiment was similar to that described in FIG. 9. As depicted in FIG. 10, the fringe pattern moves across the line sensor.

Figure 11:
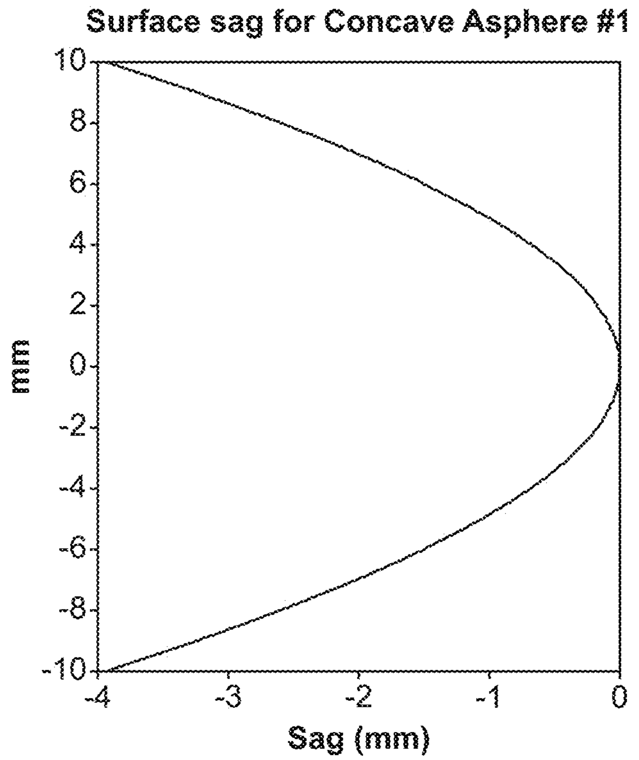
FIG. 11 depicts an angle range of reflected light for a first exemplary aspheric surface.
Figure 11:
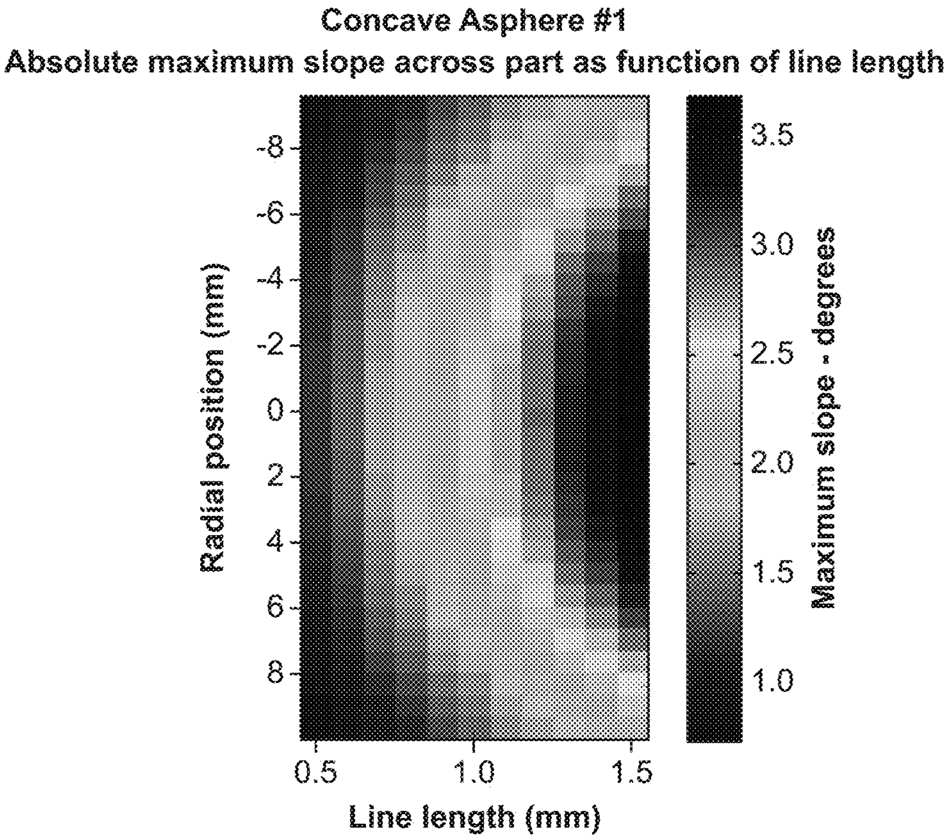

FIG. 11 depicts an angle range of reflected light for a first exemplary aspheric surface. The graph (top plot) shows the surface sag of the test surface. The shaded plot (bottom plot) shows the maximum slope (+/−) at each radial position (vertical axis) as a function of the radial region of interest (ROI), or "line length", in millimeters (mm), along the horizontal axis. The angle range is well within the detection limits of the systems and methods described herein. As depicted in FIG. 11, the "line length" indicates the length of a region on the surface that is detected by the line sensor described herein. Thus, the line length is related to a (FOV) of the line sensor, which is in turn related to the dynamic range of surface slopes that may be measured using the systems and methods described herein.

Figure 12:
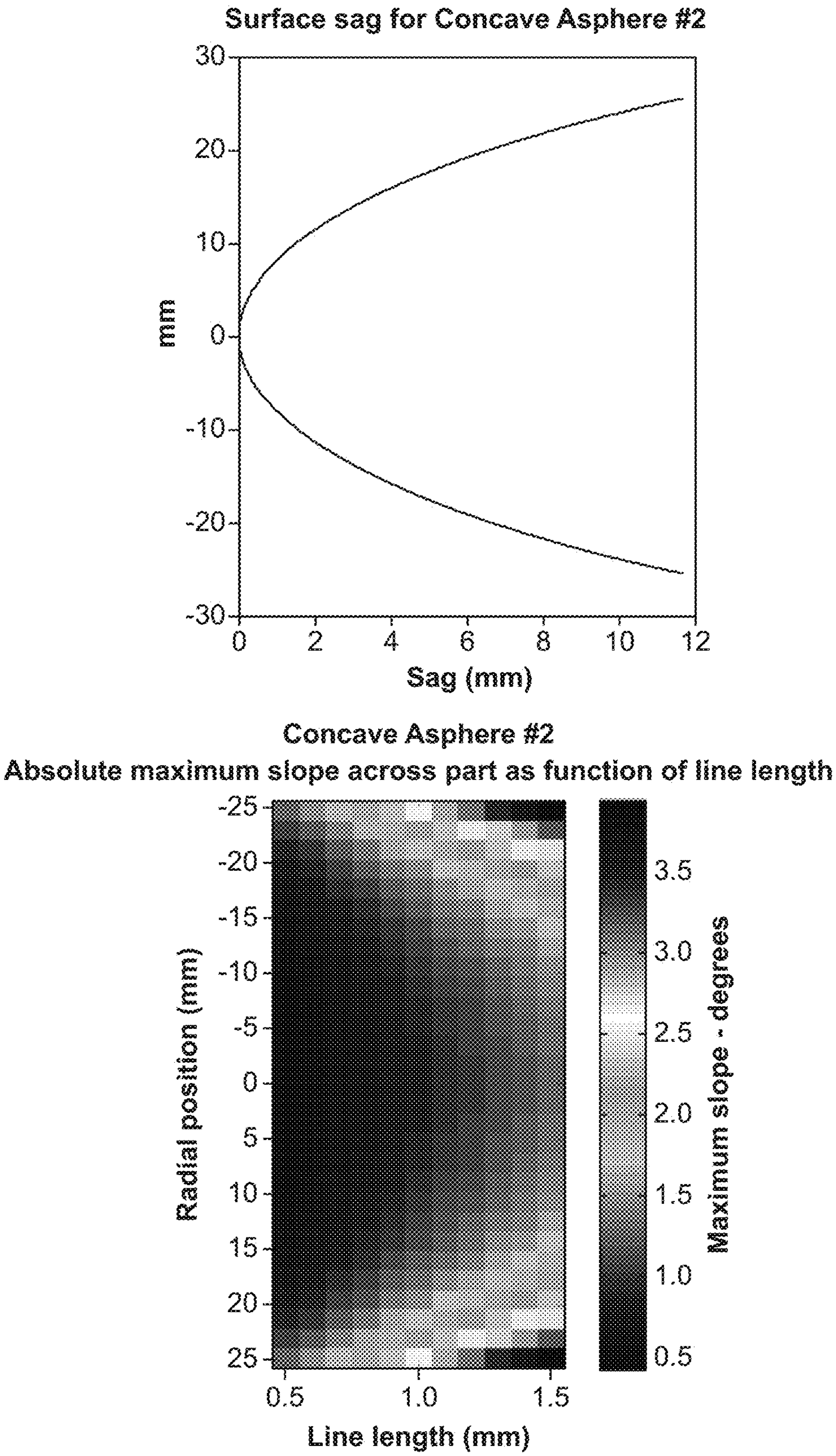
FIG. 12 depicts an angle range of reflected light for a second exemplary aspheric surface.

FIG. 12 depicts an angle range of reflected light for a second exemplary aspheric surface. The graph (top plot) shows the surface sag of the test surface. The shaded plot (bottom plot) shows the maximum slope (+/−) at each radial position (vertical axis) as a function of the radial ROI, or "line length", in millimeters (mm), along the horizontal axis. The circled region for the second exemplary aspheric surface is a line length of 1 mm at the maximum part radius of 25 mm that will have a surface slope range of +/−2.6°. The angle range of the reflected light is twice this, or +/−5.2°. This angle range is well within the detection limits of the systems and methods described herein.

Figure 13:
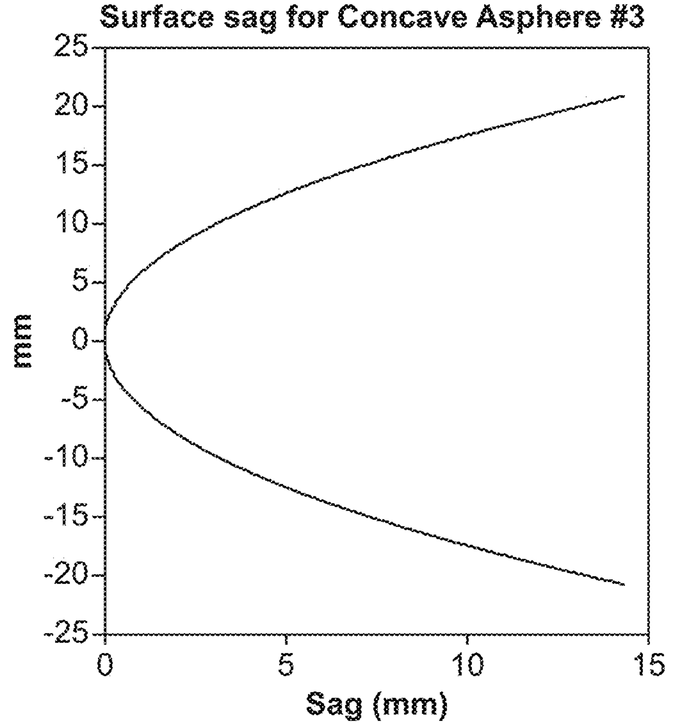
FIG. 13 depicts an angle range of reflected light for a third exemplary aspheric surface.
Figure 13:
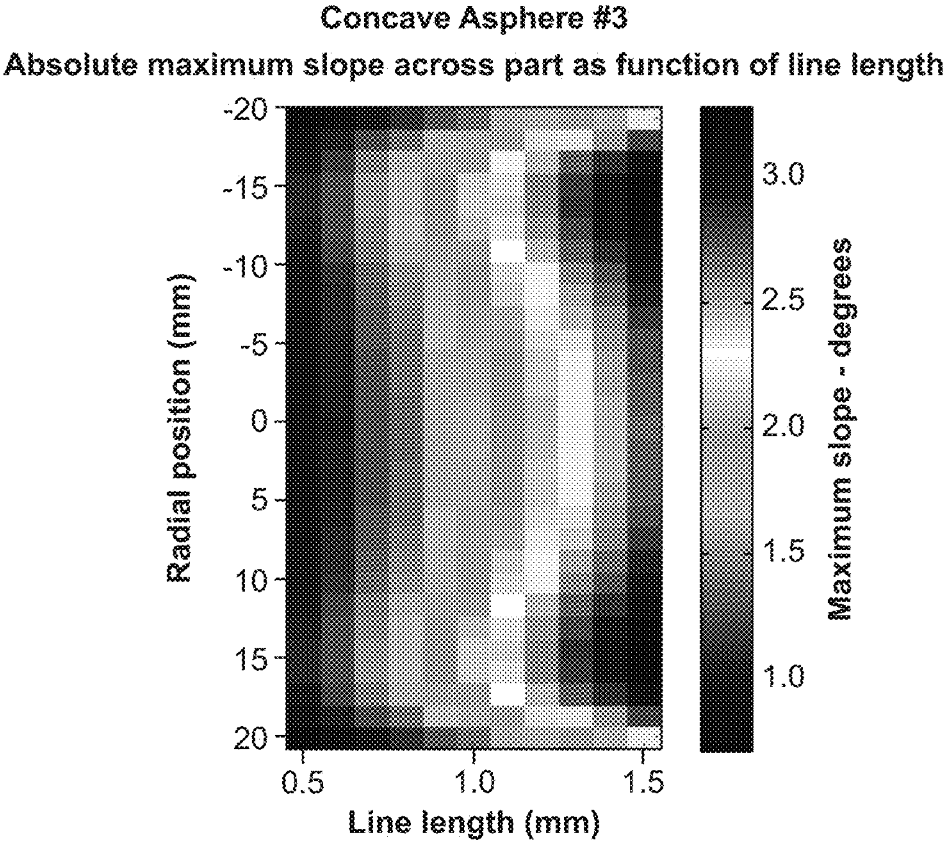

FIG. 13 depicts an angle range of reflected light for a third exemplary aspheric surface. The graph (top plot) shows the surface sag of the test surface. The shaded plot (bottom plot) shows the maximum slope (+/−) at each radial position (vertical axis) as a function of the radial ROI, or "line length", in millimeters (mm), along the horizontal axis. This angle range is well within the detection limits of the systems and methods described herein.

Figure 14:
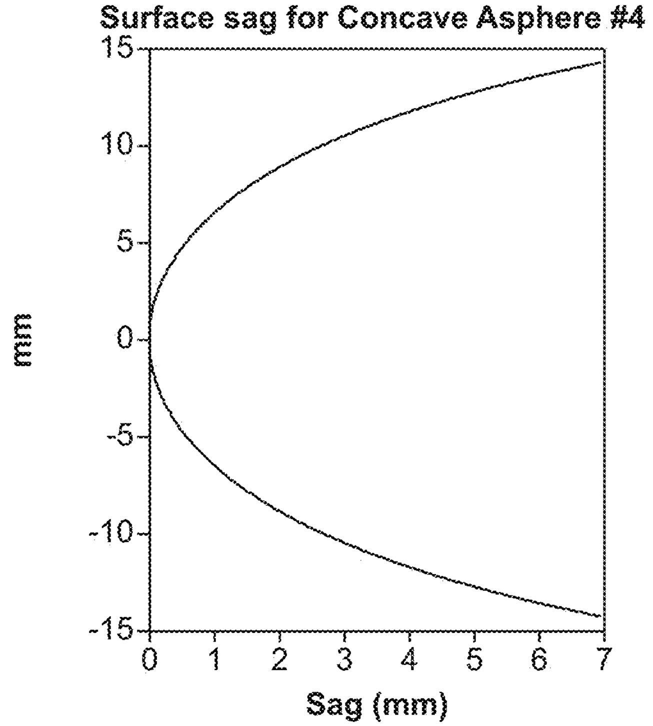
FIG. 14 depicts an angle range of reflected light for a fourth exemplary aspheric surface.
Figure 14:
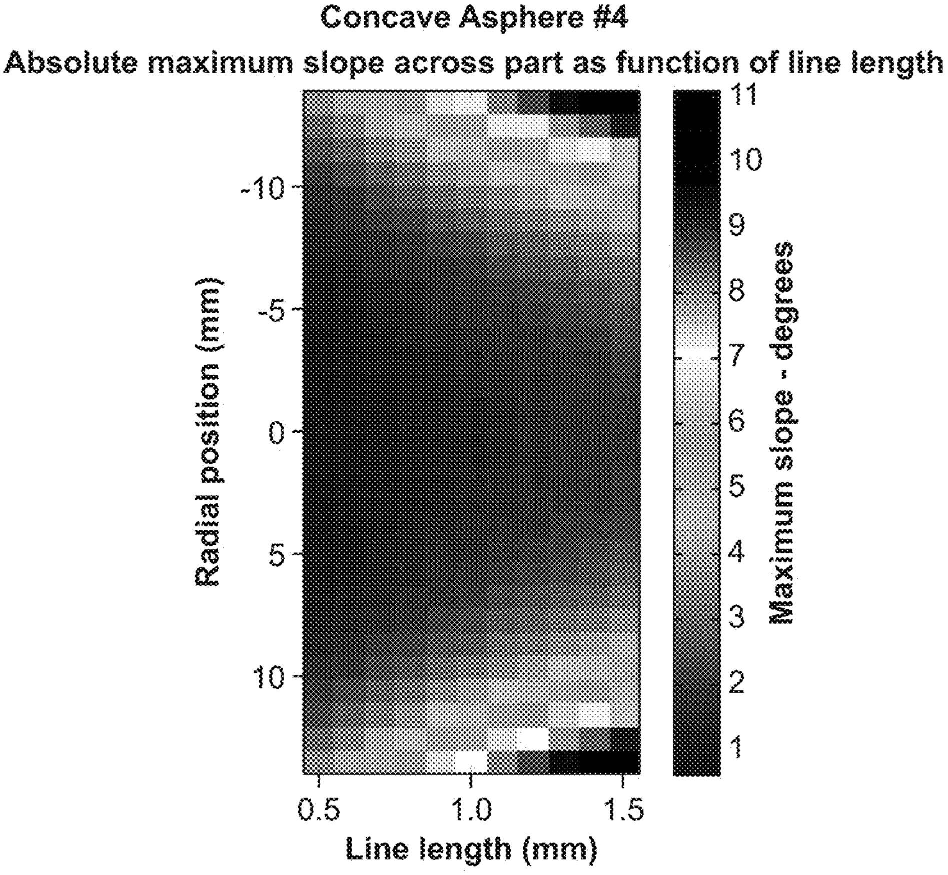

FIG. 14 depicts an angle range of reflected light for a fourth exemplary aspheric surface. The graph (top plot) shows the surface sag of the test surface. The shaded plot (bottom plot) shows the maximum slope (+/−) at each radial position (vertical axis) as a function of the radial ROI, or "line length", in millimeters (mm), along the horizontal axis. The reflected light from the fourth aspheric surface has an angular range of +/−14.4° (surface is)+/−7.2° at a radial position of 14 mm for a line length of 1 mm. This is the largest angle departure examined. Such an angle may not be accepted basis on the numerical aperture (NA) of the sample focusing lenses described herein. In such a case, the systems and methods described herein may be slightly modified to use a smaller region at the center of the radial ROI on each rotation (i.e., a smaller line length). The surface may then be moved relative to the measurement system at the cost of a slightly longer measurement time.

Figure 15:
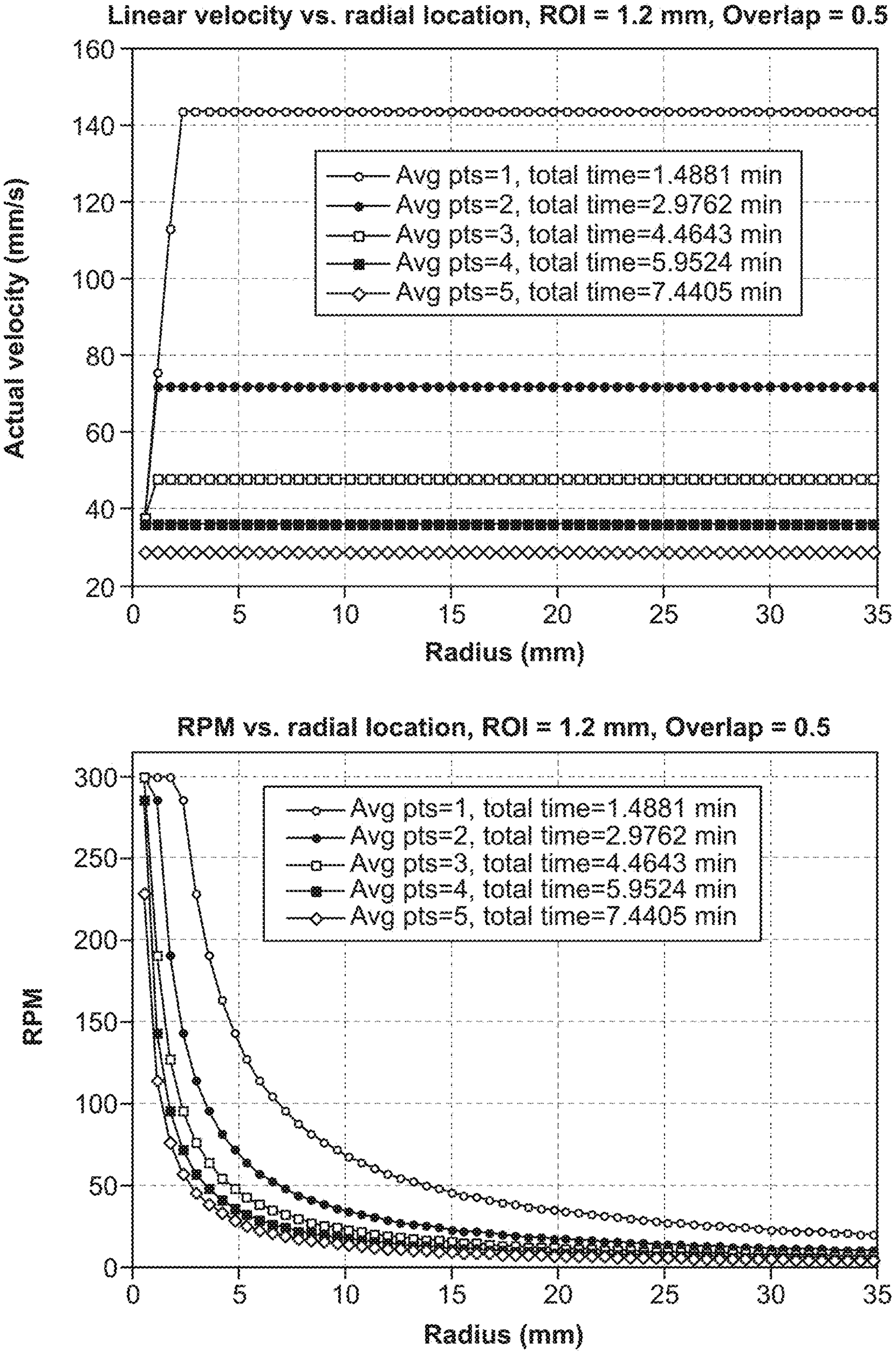
FIG. 15 shows an example of measurement times associated with the systems and methods described herein.

FIG. 15 shows an example of measurement times associated with the systems and methods described herein. Assuming a test part with a radius of 35 mm, a radial ROI of 1.2 mm, and a ratio of overlap between rotation N and N+1 of 50%, the time required to measure the entire surface with 25 μm spatial resolution in both directions can be determined. If no points are averaged, such a part can be measured in 1.488 minutes, as shown in the upper plot. The upper plot also shows measurement times associated with a variety of levels of signal averaging. The lower plot shows the rotation of the part in rotations per minute (RPM) as a function of radial position. Table 1 shows estimates of the time required to measure a 35 mm radius asphere, assuming 25 μm spatial resolution, no oversampling for noise reduction, a detector line rate of 28.735 kHz, and a 50% overlap between measurements. Using these values, a measurement time of approximately 90 seconds is required. Thus, the systems and methods described herein may be used to measure the surface of an aspherical part with 25 μm×25 μm accuracy over a 70 mm diameter in a period of about 1.5 minutes.

TABLE 1

Estimates of time required to measure a 35 mm radius asphere.

| | |
|---|---|
| Part radius (mm) | 35 |
| Line length of the ROI (mm) | 1.2 |
| Ratio | 0.5 |
| Radial change/revolution (mm) | 0.6 |
| Total revolutions needed | 58.3333 |
| Samples/phase measurement | 5 |
| Spatial resolution (μm) | 25 |
| Total radial distance (mm) | 12828.17 |
| Max allowed rotations/minute | 300 |
| Averaged phase, along radius | See FIG. 15 |
| Measurement time | See FIG. 15 |
| Actual velocity vs. radii | See FIG. 15 |
| Actual RPM vs. radii | See FIG. 15 |

Table 2 shows expected noise levels due to random noise in the optical detector and irradiance fluctuations on a time scale of approximately 10 kilohertz (kHz). Assuming a signal-to-noise ratio (SNR) of 100, an optical detector digitized to 16 bits, a wavelength of 790 nm, and a z error that scales linearly with SNR, the one-sigma z-error due to detector noise is expected to be about 0.24 nm.

TABLE 2

Expected noise levels due to random noise in the optical detector and irradiance fluctuations on a time scale of approximately 10 kHz.

| | | |
|---|---|---|
| Signal to noise ratio (SNR) | 100 | Estimate |
| Percentage noise/signal | 1.00% | Estimate |
| Phase measurement error | 0.20% | ⅕ of value above |
| nm z per period | 395 | nm (wavelength/2) |
| Error/measurement | 0.79 | nm |
| Radial averaging ($R_a$) | 5.357 | Depends on magnification |
| Azimuthal averaging ($A_a$) | 2 | Depends on rotation speed |
| Averaging improvement | 3.2733 | Factor ($\sqrt{(R_a*A_a)}$ |
| Z error at spatial resolution | 0.2413 | nm |

Recitation of Embodiments

Embodiment 1. A method for measuring a height property of a surface, comprising:

a) for each angle of a plurality of angles:
  i) rotating the surface through the angle;
  ii) directing a first line of light at the surface;
    iii) directing a second line of light at the surface;

iv) receiving the first and second lines of light, the first and second lines of light having a shear distance between one another; and v) detecting an interference pattern between the first and second lines of light;

b) generating a plurality of interference patterns, each interference pattern of the plurality of interference patterns corresponding to an angle of the plurality of angles; and c) determining the height property of the surface based upon the plurality of interference patterns.

Embodiment 2. The method of Embodiment 1, wherein the surface comprises a surface of an optical component.

Embodiment 3. The method of Embodiment 2, wherein the optical component comprises an aspheric optical component.

Embodiment 4. The method of Embodiment 3, wherein the aspheric optical component comprises an aspheric lens.

Embodiment 5. The method of any one of Embodiments 1-4, wherein the first line of light comprises a first frequency or wavelength and the second line of light comprises a second frequency or wavelength different from the first frequency or wavelength.

Embodiment 6. The method of any one of Embodiments 1-5, wherein the first line of light comprises a first polarization and the second line of light comprises a second polarization different from the first polarization.

Embodiment 7. The method of any one of Embodiments 1-6, wherein a portion of the first line of light or a portion of the second line of light is substantially normal to the surface along at least one axis.

Embodiment 8. The method of any one of Embodiments 1-7, wherein the first line of light is substantially parallel to the second line of light.

Embodiment 9. The method of any one of Embodiments 1-8, further comprising, prior to (a)(ii), introducing the shear distance between the first line of light and the second line of light.

Embodiment 10. The method of any one of Embodiments 1-8, further comprising, subsequent to (a)(iii), introducing the shear distance between the first line of light and the second line of light.

Embodiment 11. The method of Embodiment 9 or 10, further comprising repeating (a)-(c) for a plurality of shear distances between the first line of light and the second line of light.

Embodiment 12. The method of any one of Embodiments 1-11, wherein the height property comprises a mid-spatial frequency (MSF) spectrum or a topography of the surface.

Embodiment 13. The method of any one of Embodiments 1-12, wherein (c) comprises:

i) determining a plurality of differences in surface height between a first plurality of locations on the first line of light and a second plurality of locations on the second line of light based upon the plurality of interference patterns; and ii) determining the height property based upon the plurality of differences in surface height.

Embodiment 14. The method of any one of Embodiments 1-13, further comprising, prior to (a)(ii), orthogonally polarizing the first line of light with respect to the second line of light.

Embodiment 15. The method of Embodiment 13, further comprising, subsequent to (a)(iii) and prior to (a)(iv), parallelly polarizing the first line of light with respect to the second line of light.

Embodiment 16. The method of any one of Embodiments 1-15, wherein the first line of light and the second line of light have a temporal coherence of at most 100 femtoseconds (fs).

Embodiment 17. The method of any one of Embodiments 1-16, wherein (b) comprises generating the plurality of interference patterns at a rate of at least 1,000 Hertz (Hz).

Embodiment 18. The method of any one of Embodiments 1-17, wherein (c) comprises determining the height property of the surface with a spatial resolution of 25 micrometers (μm) or less.

Embodiment 19. A system for measuring a height property of a surface, comprising:

a) a rotational module configured to rotate the surface through a plurality of angles;

b) an optical source module configured to, for each angle of the plurality of angles, direct a first line of light and a second line of light at the surface;

c) an optical detector configured to, for each angle of the plurality of angles, receive the first and second lines of light and detect an interference pattern between the first and second lines of light, the first and second lines of light having a shear distance between one another; and d) a storage module configured to store the interference pattern associated with each angle of the plurality of angles, thereby generating a plurality of interference patterns.

Embodiment 20. The system of Embodiment 19, wherein the surface comprises a surface of an optical component.

Embodiment 21. The system of Embodiment 20, wherein the optical component comprises an aspheric optical component.

Embodiment 22. The system of Embodiment 21, wherein the aspheric optical component comprises an aspheric lens.

Embodiment 23. The system of any one of Embodiments 19-22, wherein the first line of light comprises a first frequency or wavelength and the second line of light comprises a second frequency or wavelength different from the first frequency or wavelength.

Embodiment 24. The system of any one of Embodiments 19-23, wherein the first line of light comprises a first polarization and the second line of light comprises a second polarization different from the first polarization.

Embodiment 25. The system of any one of Embodiments 19-24, wherein a portion of the first line of light or a portion of the second line of light is substantially normal to the surface along at least one axis.

Embodiment 26. The system of any one of Embodiments 19-25, wherein the first line of light is substantially parallel to the second line of light.

Embodiment 27. The system of any one of Embodiments 19-26, further comprising a shear adjustment module configured to introduce the shear distance between the first line of light and the second line of light.

Embodiment 28. The system of Embodiment 27, wherein the shear adjustment module is configured to introduce a plurality of shear distances between the first line of light and the second line of light.

Embodiment 29. The system of Embodiment 27 or 28, wherein the shear adjustment module comprises a Wollaston prism.

Embodiment 30. The system of any one of Embodiments 27-29, wherein the shear adjustment module is located between the optical source module and the surface.

Embodiment 31. The system of any one of Embodiments 27-29, wherein the shear adjustment module is located between the surface and the optical detector Embodiment 32. The system of any one of Embodiments 19-31, wherein the height property comprises an MSF spectrum or a topography of the surface.

Embodiment 33. The system of any one of Embodiments 19-32, further comprising an analysis module configured to determine the height property of the surface based upon the plurality of interference patterns by:

i) determining a plurality of differences in surface height between a first plurality of locations on the first line of light and a second plurality of locations on the second line of light based upon the plurality of interference patterns; and ii) determining the height property based upon the plurality of differences in surface height.

Embodiment 34. The system of Embodiment 33, wherein the analysis module comprises:

a processor; and a memory coupled with the processor, wherein the memory is configured to provide the processor with instructions which when executed cause the processor to execute (i) and (ii).

Embodiment 35. The system of Embodiment 33, wherein the analysis module comprises:

a processor configured to execute (i) and (ii); and a memory coupled to the processor and configured to provide the processor with instructions corresponding to (i) and (ii).

Embodiment 36. The system of any one of Embodiments 19-35, further comprising a first polarizing module configured to orthogonally polarize the first line of light with respect to the second line of light, the first polarizing module located between the optical source module and the surface.

Embodiment 37. The system of Embodiment 36, wherein the first polarizing module comprises two polarizers and an amplitude beamsplitter, a polarizing beamsplitter, or two polarization-maintaining (PM) optical fibers combined into one PM fiber using a fiber combiner.

Embodiment 38. The system of Embodiment 36 or 37, further comprising a second polarizing module configured to parallelly polarize the first line of light with respect to the second line of light, the second polarizing module located between the surface and the optical detector.

Embodiment 39. The system of Embodiment 38, wherein the second polarizing module comprises two polarizers and an amplitude beamsplitter, a polarizing beamsplitter, or two PM optical fibers combined into one PM fiber using a fiber combiner.

Embodiment 40. The system of any one of Embodiments 19-39, wherein the optical source module comprises an optical source configured to emit the first and second lines of light.

Embodiment 41. The system of Embodiment 41, wherein the optical source comprises a light emitting diode (LED) or superluminescent diode (SLD).

Embodiment 42. The system of Embodiment 40 or 41, wherein the optical source module further comprises an acousto-optic frequency shifter (AOFS) configured to introduce a frequency or wavelength shift between the first line of light and the second line of light.

Embodiment 43. The system of any one of Embodiments 19-39, wherein the optical source module comprises a first optical source configured to emit the first line of light and a second optical source configured to emit the second line of light.

Embodiment 44. The system of Embodiment 43, wherein the first optical source or the second optical source comprises an LED, an SLD, or a laser.

Embodiment 45. The system of any one of Embodiments 19-44, wherein the optical detector comprises a line sensor.

Embodiment 46. The system of any one of Embodiments 19-45, wherein the first line of light and the second line of light have a temporal coherence of at most 100 fs.

Embodiment 47. The system of any one of Embodiments 19-46, wherein the system is configured to generate the plurality of interference patterns at a rate of at least 1,000 Hz.

Embodiment 48. The system of any one of Embodiments 19-47, wherein the system is configured to determine the height property of the surface with a spatial resolution of 25 μm or less.

Embodiment 49. A method for measuring a height property of a surface, comprising:

a) for each location of a plurality of locations:

i) positioning the surface at the location;

ii) directing a first line of light at the surface;

iii) directing a second line of light at the surface;

iv) receiving the first and second lines of light, the first and second lines of light having a shear distance between one another; and v) detecting an interference pattern between the first and second lines of light;

b) generating a plurality of interference patterns, each interference pattern of the plurality of interference patterns corresponding to a location of the plurality of locations; and c) determining the height property of the surface based upon the plurality of interference patterns.

Embodiment 50. The method of Embodiment 49, wherein the surface comprises a surface of a wing.

Embodiment 51. The method of Embodiment 50, wherein the wing comprises a plurality of aerodynamic riblets.

Embodiment 52. A system for measuring a height property of a surface, comprising:

a) a positioning module configured to position the surface at a plurality of locations;

b) an optical source module configured to, for each location of the plurality of locations, direct a first line of light and a second line of light at the surface;

c) an optical detector configured to, for each location of the plurality of locations, receive the first and second lines of light and detect an interference pattern between the first and second lines of light, the first and second lines of light having a shear distance between one another; and d) a storage module configured to store the interference pattern associated with each location of the plurality of locations, thereby generating a plurality of interference patterns.

Embodiment 53. The system of Embodiment 52, wherein the surface comprises a surface of a wing.

Embodiment 54. The system of Embodiment 53, wherein the wing comprises a plurality of aerodynamic riblets.

Embodiment 55. A method for measuring a height property of a surface, comprising:

a) for each angle of a plurality of angles:

i) rotating the surface through the angle;

ii) directing a first line of light at the surface;

iii) directing a second line of light at the surface;

iv) directing a third line of light at the surface;

v) directing a fourth line of light at the surface;

vi) receiving a first portion of the first line of light and a first portion of the second line of light, the first portion of the first line of light and the first portion of the second line of light having a first radial shear distance between one another;

vii) detecting a first interference pattern between the first portion of the first line of light and the first portion of the second line of light;

viii) receiving a second portion of the first line of light and a second portion of the second line of light, the second portion of the first line of light and the second portion of the second line of light having a second radial shear distance between one another, the second radial shear distance being different from the first radial shear distance;

ix) detecting a second interference pattern between the second portion of the first line of light and the second portion of the second line of light;

x) receiving the fourth line of light and a third portion of the first line of light, the fourth line of light and the third portion of the first line of light having a first azimuthal shear distance between one another;

xi) detecting a third interference pattern between the fourth line of light and the third portion of the first line of light;

xii) receiving the third line of light and a third portion of the second line of light, the third line of light and the third portion of the second line of light having a second azimuthal shear distance between one another, the second azimuthal shear distance being different from the first azimuthal shear distance; and xiii) detecting a fourth interference pattern between the third line of light and the third portion of the second line of light;

b) generating:

(i) a first plurality of interference patterns, each interference pattern of the first plurality of interference patterns corresponding to an angle of the plurality of angles and the first interference pattern associated therewith;

(ii) a second plurality of interference patterns, each interference pattern of the second plurality of interference patterns corresponding to an angle of the plurality of angles and the second interference pattern associated therewith;

(iii) a third plurality of interference patterns, each interference pattern of the third plurality of interference patterns corresponding to an angle of the plurality of angles and the third interference pattern associated therewith; and (iv) a fourth plurality of interference patterns, each interference pattern of the fourth plurality of interference patterns corresponding to an angle of the plurality of angles and the fourth interference pattern associated therewith; and c) determining the height property of the surface based upon the first plurality of interference patterns, the second plurality of interference patterns, the third plurality of interference patterns, and the fourth plurality of interference patterns.

Embodiment 56. The method of Embodiment 55, wherein the first and third lines of light comprise a first frequency or wavelength and the second and fourth lines of light comprise a second frequency or wavelength different from the first frequency or wavelength.

Embodiment 57. The method of Embodiment 55 or 56, wherein the first portion of the first line of light comprises a first polarization and the first portion of the second line of light comprises a second polarization different from the first polarization.

Embodiment 58. The method of any one of Embodiments 55-57, wherein the second portion of the first line of light comprises a first polarization and the second portion of the second line of light comprises a second polarization different from the first polarization.

Embodiment 59. The method of any one of Embodiments 55-58, wherein the third portion of the first line of light comprises a first polarization and the fourth line of light comprises a second polarization different from the first polarization.

Embodiment 60. The method of any one of Embodiments 55-59, wherein the third portion of the second line of light comprises a first polarization and the third line of light comprises a second polarization different from the first polarization.

Embodiment 61. The method of any one of Embodiments 55-60, further comprising, prior to (a)(ii), introducing the first radial shear distance between the first portion of the first line of light and the first portion of the second line of light.

Embodiment 62. The method of any one of Embodiments 55-61, further comprising, prior to (a)(ii), introducing the second radial shear distance between the second portion of the first line of light and the second portion of the second line of light.

Embodiment 63. The method of any one of Embodiments 55-62, further comprising, prior to (a)(ii), introducing the first azimuthal shear distance between the fourth line of light and the third portion of the first line of light.

Embodiment 64. The method of any one of Embodiments 55-63, further comprising, prior to (a)(ii), introducing the first azimuthal shear distance between the third line of light and the third portion of the second line of light.

Embodiment 65. A system for measuring a height property of a surface, comprising:

a) a rotational module configured to rotate the surface through a plurality of angles;

b) an optical source module configured to, for each angle of the plurality of angles, direct a first line of light, a second line of light, a third line of light, and a fourth line of light at the surface;

c) a first optical detector configured to, for each angle of the plurality of angles, receive a first portion of the first line of light and a first portion of the second line of light and detect a first interference pattern between the first portion of the first line of light and the first portion of the second line of light, the first portion of the first line of light and the first portion of the second line of light having a first radial shear distance between one another;

d) a second optical detector configured to, for each angle of the plurality of angles, receive a second portion of the first line of light and a second portion of the second line of light and detect a second interference pattern between the second portion of the first line of light and the second portion of the second line of light, the second portion of the first line of light and the second portion of the second line of light having a second radial shear distance between one another;

e) a third optical detector configured to, for each angle of the plurality of angles, receive the fourth line of light and a third portion of the first line of light and detect a third interference pattern between the fourth line of light and the third portion of the first line of light, the fourth line of the light and the third portion of the first line of light having a first azimuthal shear distance between one another;

f) a fourth optical detector configured to, for each angle of the plurality of angles, receive the third line of light and a third portion of the second line of light and detect a fourth interference pattern between the third line of light and the third portion of the second line of light, the third line of the light and the third portion of the second line of light having a second azimuthal shear distance between one another; and g) a storage module configured to:

(i) store the first interference pattern associated with each angle of the plurality of angles, thereby generating a first plurality of interference patterns;

(ii) store the second interference pattern associated with each angle of the plurality of angles, thereby generating a second plurality of interference patterns;

(iii) store the third interference pattern associated with each angle of the plurality of angles, thereby generating a third plurality of interference patterns; and (iv) store the fourth interference pattern associated with each angle of the plurality of angles, thereby generating a fourth plurality of interference patterns.

Embodiment 66. The system of Embodiment 65, wherein the first and third lines of light comprise a first frequency or wavelength and the second and fourth lines of light comprise a second frequency or wavelength different from the first frequency or wavelength.

Embodiment 67. The system of Embodiment 65 or 66, wherein the first portion of the first line of light comprises a first polarization and the first portion of the second line of light comprises a second polarization different from the first polarization.

Embodiment 68. The system of any one of Embodiments 65-67, wherein the second portion of the first line of light comprises a first polarization and the second portion of the second line of light comprises a second polarization different from the first polarization.

Embodiment 69. The system of any one of Embodiments 65-68, wherein the third portion of the first line of light comprises a first polarization and the fourth line of light comprises a second polarization different from the first polarization.

Embodiment 70. The system of any one of Embodiments 65-69, wherein the third portion of the second line of light comprises a first polarization and the third line of light comprises a second polarization different from the first polarization.

Embodiment 71. The system of any one of Embodiments 65-70, further comprising a radial shear module configured to introduce: (i) the first radial shear distance between the first portion of the first line of light and the first portion of the second line of light and (ii) the second radial shear distance between the second portion of the first line of light and the second portion of the second line of light.

Embodiment 72. The system of Embodiment 71, wherein the radial shear module comprises a Wollaston prism.

Embodiment 73. The system of Embodiment 71 or 72, wherein the radial shear module is located between the surface and the first optical detector and between the surface and the second optical detector.

Embodiment 74. The system of any one of Embodiments 65-73, further comprising an azimuthal shear module configured to introduce: (i) the first azimuthal shear distance between the fourth line of the light and the third portion of the first line of light and (ii) the second azimuthal shear distance between the third line of the light and the third portion of the second line of light.

Embodiment 75. The system of Embodiment 74, wherein the azimuthal shear module comprises a Risley prism and a birefringent wedge.

Embodiment 76. The system of Embodiment 74 or 75, wherein the azimuthal shear module is located between the optical source module and the surface.

Embodiment 77. The system of any one of Embodiments 74-76, further comprising an optical path difference (OPD) correction module configured to match: (i) an OPD between the fourth line of light and the third portion of the first line of light and (ii) an OPD between the third line of light and the third portion of the second line of light.

Embodiment 78. The system of Embodiment 77, wherein the OPD correction module comprises a Risley prism and a birefringent wedge.

Embodiment 79. The system of Embodiment 78, wherein the OPD correction module further comprises a Wollaston prism configured to impart an angular separation between the third portion of the first line of light and the third portion of the second line of light.

Embodiment 80. The system of any one of Embodiments 77-79, wherein the OPD correction module is located between the surface and the third optical detector and between the surface and the fourth optical detector.

Embodiment 81. The system of any one of Embodiments 65-80, further comprising an analysis module configured to determine the height property of the surface based upon the first plurality of interference patterns, the second plurality of interference patterns, the third plurality of interference patterns, and the fourth plurality of interference patterns by:

i) determining a plurality of differences in surface height between a first plurality of locations on the first line of light and a second plurality of locations on the second line of light based upon the plurality of interference patterns; and ii) determining the height property based upon the plurality of differences in surface height.

Embodiment 82. The system of Embodiment 81, wherein the analysis module comprises:

a processor, and a memory coupled with the processor, wherein the memory is configured to provide the processor with instructions which when executed cause the processor to execute (i) and (ii).

Embodiment 83. The system of Embodiment 81, wherein the analysis module comprises:

a processor configured to execute (i) and (ii); and a memory coupled to the processor and configured to provide the processor with instructions corresponding to (i) and (ii).

The invention claimed is:

1. A method for measuring a height property of a surface, comprising:

a) for each angle of a plurality of angles:

i) rotating the surface through the angle about an axis;

ii) directing a first light at the surface;

iii) directing a second light at the surface;

iv) receiving the first and second lights, the first and second lights having a shear distance between one another; and v) detecting an interference pattern between the first and second lights;

b) generating a plurality of interference patterns, each interference pattern of the plurality of interference patterns corresponding to an angle of the plurality of angles; and c) determining the height property of the surface based upon the plurality of interference patterns;

wherein the first light comprises a first frequency or wavelength and the second light comprises a second frequency or wavelength different from the first frequency or wavelength; and wherein the first light comprises a first polarization and the second light comprises a second polarization different from the first polarization.

2. The method of claim 1, wherein the surface comprises a surface of an optical component.

3. The method of claim 2, wherein the optical component comprises an aspheric optical component.

4. The method of claim 3, wherein the aspheric optical component comprises an aspheric lens.

5. The method of claim 1, wherein the first light comprises a first line of light and the second light comprises a second line of light.

6. The method of claim 5, wherein the first line of light is along a radial direction with respect to the axis and the second line of light is along a radial direction with respect to the axis.

7. The method of claim 1, wherein a portion of the first light or a portion of the second light is substantially normal to the surface along at least one axis.

8. The method of claim 1, wherein the first light is substantially parallel to the second light.

9. The method of claim 1, further comprising, prior to (a)(ii), introducing the shear distance between the first light and the second light.

10. The method of claim 9, further comprising repeating (a)-(c) for a plurality of shear distances between the first light and the second light.

11. The method of claim 1, further comprising, subsequent to (a)(iii), introducing the shear distance between the first light and the second light.

12. The method of claim 11, further comprising repeating (a)-(c) for a plurality of shear distances between the first light and the second light.

13. The method of claim 1, wherein the height property comprises a mid-spatial frequency (MSF) spectrum or a topography of the surface.

14. The method of claim 1, wherein (c) comprises:

i) determining a plurality of differences in surface height between a first plurality of locations on the first light and a second plurality of locations on the second light based upon the plurality of interference patterns; and ii) determining the height property based upon the plurality of differences in surface height.

15. The method of claim 1, further comprising, prior to (a)(ii), orthogonally polarizing the first light with respect to the second light.

16. The method of claim 14, further comprising, subsequent to (a)(iii) and prior to (a)(iv), parallelly polarizing the first light with respect to the second light.

17. The method of claim 1, wherein the first light and the second light have a temporal coherence of at most 1,000 femtoseconds (fs).

18. The method of claim 1, wherein (b) comprises generating the plurality of interference patterns at a rate of at least 100 Hertz (Hz).

19. The method of claim 1, wherein (c) comprises determining the height property of the surface with a spatial resolution of 25 micrometers (μm) or less.

20. A system for measuring a height property of a surface, comprising:

a) a rotational module configured to rotate the surface about an axis through a plurality of angles;

b) an optical source module configured to, for each angle of the plurality of angles, direct a first light and a second light at the surface;

c) an optical detector configured to, for each angle of the plurality of angles, receive the first and second lights and detect an interference pattern between the first and second lights, the first and second lights having a shear distance between one another; and d) a storage configured to store the interference pattern associated with each angle of the plurality of angles, thereby generating a plurality of interference patterns;

wherein the first light comprises a first frequency or wavelength and the second light comprises a second frequency or wavelength different from the first frequency or wavelength; and wherein the first light comprises a first polarization and the second light comprises a second polarization different from the first polarization.

21. The system of claim 20, wherein the surface comprises a surface of an optical component.

22. The system of claim 21, wherein the optical component comprises an aspheric optical component.

23. The system of claim 20, wherein the first light comprises a first line of light and the second light comprises a second line of light.

24. The system of claim 23, wherein the first line of light is along a radial direction with respect to the axis and the second line of light is along a radial direction with respect to the axis.

25. The system of claim 20, wherein a portion of the first light or a portion of the second light is substantially normal to the surface along at least one axis.

26. The system of claim 20, wherein the first light is substantially parallel to the second light.

27. The system of claim 20, wherein the shear distance between the first light and the second light is introduced prior to directing the first light at the surface.

28. The system of claim 20, wherein the shear distance between the first light and the second light is introduced subsequent to directing the second light at the surface.

29. The system of claim 20, wherein the first light and the second light have a temporal coherence of at most 1,000 femtoseconds (fs).

30. The system of claim 20, wherein generating the plurality of interference patterns comprises generating the plurality of interference patterns at a rate of at least 100 Hertz (Hz).

31. The system of claim 20, wherein a height property of the surface is determined based upon the plurality of interference patterns.

32. The system of claim 31, wherein the height property comprises a mid-spatial frequency (MSF) spectrum or a topography of the surface.

33. The system of claim 31, wherein the height property of the surface is determined with a spatial resolution of 25 micrometers (μm) or less.

* * * * *